US012136333B2

(12) United States Patent
Ellmers et al.

(10) Patent No.: US 12,136,333 B2
(45) Date of Patent: Nov. 5, 2024

(54) EMERGENCY PREPAREDNESS ALERT NOTIFICATION SYSTEM FOR NUCLEAR POWER PLANTS

(71) Applicant: Florida Power & Light Company, Juno Beach, FL (US)

(72) Inventors: Kurt E. Ellmers, Fort Pierce, FL (US); James B. Patterson, Port Saint Lucie, FL (US); Wryan Tyler Cross, Stuart, FL (US); Jow H. Ortiz, Coral Springs, FL (US); Michael E. Powers, Stuart, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 134 days.

(21) Appl. No.: 18/068,884

(22) Filed: Dec. 20, 2022

(65) Prior Publication Data

US 2024/0203235 A1 Jun. 20, 2024

(51) Int. Cl.
*G08B 29/02* (2006.01)

(52) U.S. Cl.
CPC .................................... *G08B 29/02* (2013.01)

(58) Field of Classification Search
CPC ...................................................... G08B 29/02
See application file for complete search history.

(56) References Cited

U.S. PATENT DOCUMENTS 5,083,109 A * 1/1992 McElroy ................ G08B 29/10 340/672
5,838,231 A 11/1998 Scherbarth
(Continued)

FOREIGN PATENT DOCUMENTS

CN 210488715 U 5/2020
EP 0049202 A1 4/1982
(Continued)

OTHER PUBLICATIONS

Planning for Rare Events: Nuclear Accident Preparedness and Management; Proceedings of an International Workshop, Jan. 28-30, 1980 1980.
(Continued)

*Primary Examiner* — Daryl C Pope
(74) *Attorney, Agent, or Firm* — Jose Gutman; Fleit Intellectual Property Law

(57) ABSTRACT

An emergency preparedness alert notification system includes a central siren control system (CSCS) (102) remotely located from a multiplicity of rotating siren systems (104, 106, 108) distributed over diverse wide geographic regions, and which can be automatically tested by the CSCS. The testing method can be automatically repeated to accurately and timely capture test result data, and alarm conditions, from each of the multiplicity of remotely located at least one rotating siren system. Individual components of each rotating siren system are diagnosed and the test results, including any alarm conditions, can be automatically reported via wirelessly transmitted messages 702 to the CSCS. Technical and repair personnel can be dispatched to a particular siren site based on the automatic testing results reported at the CSCS. The retrofittable system can predict a future occurrence of a failure of a particular component of a rotating siren system.

20 Claims, 8 Drawing Sheets

(56) References Cited

U.S. PATENT DOCUMENTS

| | | | | |
|---|---|---|---|---|
| 6,121,875 | A * | 9/2000 | Hamm | H05B 47/10 250/214 AL |
| 6,441,723 | B1 | 8/2002 | Mansfield et al. | |
| 6,492,901 | B1 | 12/2002 | Ridolfo | |
| 7,409,428 | B1 * | 8/2008 | Brabec | H04L 65/102 709/248 |
| 7,489,136 | B1 | 2/2009 | Poland | |
| 7,649,472 | B1 * | 1/2010 | Paterno | G08B 7/06 340/815.45 |
| 8,884,759 | B2 | 11/2014 | Oktem et al. | |
| 8,924,588 | B2 | 12/2014 | Petite | |
| 9,571,582 | B2 | 2/2017 | Petite et al. | |
| 9,886,843 | B2 | 2/2018 | Warren et al. | |
| 9,940,824 | B2 | 4/2018 | Berezowski et al. | |
| 10,825,337 | B2 | 11/2020 | Piech et al. | |
| 11,015,577 | B2 * | 5/2021 | Son | G06Q 10/087 |
| 11,120,642 | B2 | 9/2021 | Rapeta et al. | |
| 2002/0175641 | A1 * | 11/2002 | Andersen | H05B 47/10 315/312 |
| 2008/0313006 | A1 * | 12/2008 | Witter | G01F 13/006 705/7.17 |
| 2009/0121868 | A1 * | 5/2009 | Flanders | F16K 37/0083 340/540 |
| 2012/0260313 | A1 | 10/2012 | Gomez | |
| 2012/0286946 | A1 | 11/2012 | Karl et al. | |
| 2014/0266675 | A1 | 9/2014 | Piccolo, III | |
| 2015/0310732 | A1 | 10/2015 | Piccolo, III | |
| 2015/0348253 | A1 * | 12/2015 | Bendall | H04N 7/183 348/86 |
| 2018/0249054 | A1 * | 8/2018 | Chien | F21V 23/0464 |

FOREIGN PATENT DOCUMENTS

| | | | |
|---|---|---|---|
| GB | 1010704 | A | 11/1965 |
| GB | 1433195 | A | 4/1976 |
| JP | 5951944 | B2 | 7/2016 |
| KR | 1594439 | B1 | 2/2016 |
| SK | 86392 | A3 | 9/1994 |
| WO | 9106960 | A1 | 5/1991 |
| WO | 9910894 | A2 | 6/1999 |
| WO | 2012036707 | A1 | 3/2012 |

OTHER PUBLICATIONS

Gee, R. F. Oak Ridge Reservation Public Warning Siren System Annual Test Report. No. EMPO-561 Rev. 0. Oak Ridge Y-12 Plant (Y-12), Oak Ridge, TN (United States), 2000. 2000.

Mishra et al, Design and Testing of a Real-Time Audio-Quality Feedback System for Weather Broadcasts and a Framework for a Weather Broadcast Transmission Technology Switch 2019.

Integrated Public Alert and Warning System (IPAWS) 2007.

A proactive alarm reduction method and its human factors validation test for a main control room for Smart Annals of Nuclear Energy 51 (2013): 125-134. 2013.

Tanczos, R. C., and A. C. Kanen. Emergency warning systems. Part 2. Warning systems—evaluation guidelines. Final report 1982-1983. No. AD-A-131112/5. PRC Voorhees, McLean, VA (USA), 1983. 1983.

* cited by examiner

EMERGENCY PREPAREDNESS ALERT NOTIFICATION SYSTEM FOR NUCLEAR POWER PLANTS

FIELD OF THE DISCLOSURE

The present invention generally relates to nuclear power plants alert notification systems and methods, and more particularly to a retrofittable information processing system for automatically monitoring operational status and maintaining alert signal siren equipment in a multiplicity of remotely located alert signal siren sites distributed over diverse wide geographic regions.

BACKGROUND

Nuclear Power Plants include an Emergency Preparedness Alert Notification System (ANS). Such an ANS includes a multiplicity (e.g., at least ten, and possibly at least one hundred) of remotely located alert signal sirens distributed over diverse wide geographic regions. Operations personnel must perform regular maintenance and test/verify the operation of each siren. The testing and maintenance functions involve a large amount of manual test procedures with multiple technicians operating test equipment on each siren which is remotely located. Technicians must open up each siren, connect several different pieces of test equipment inside, and manually run through testing and maintenance procedures, and then log all the collected test results data and maintenance data by hand. The technicians also must manually deliver this logged information to a Nuclear Share-Point site where the logged information is entered by data entry personnel into an information processing system and database.

The above-described mostly manual process for testing siren equipment must be regularly performed on all individual remotely located sirens which are distributed over diverse wide geographic regions. This process, for the most part being performed manually, is slow, tedious, and consumes resources at a high cost.

BRIEF DESCRIPTION OF THE SEVERAL VIEWS OF THE DRAWINGS

The accompanying figures can include the same reference numerals that refer to identical or functionally similar elements throughout the separate views. These figures, together with the specification, which contains the detailed description below, serve to illustrate various embodiments and to explain different principles and advantages and are all incorporated into the present disclosure, in which.

DETAILED DESCRIPTION

As required, this section discloses detailed embodiments; however, the disclosed embodiments are merely examples that illustrate systems and methods described below in various forms. Therefore, specific structural and functional details disclosed herein are only non-limiting examples provided as a basis for the claims and teaching one of ordinary skill in the art to variously employ the disclosed subject matter in virtually any appropriately detailed structure and function. Further, the terms and phrases used herein are not limiting but rather provide an understandable description.

INTRODUCTION

Figure 7A:
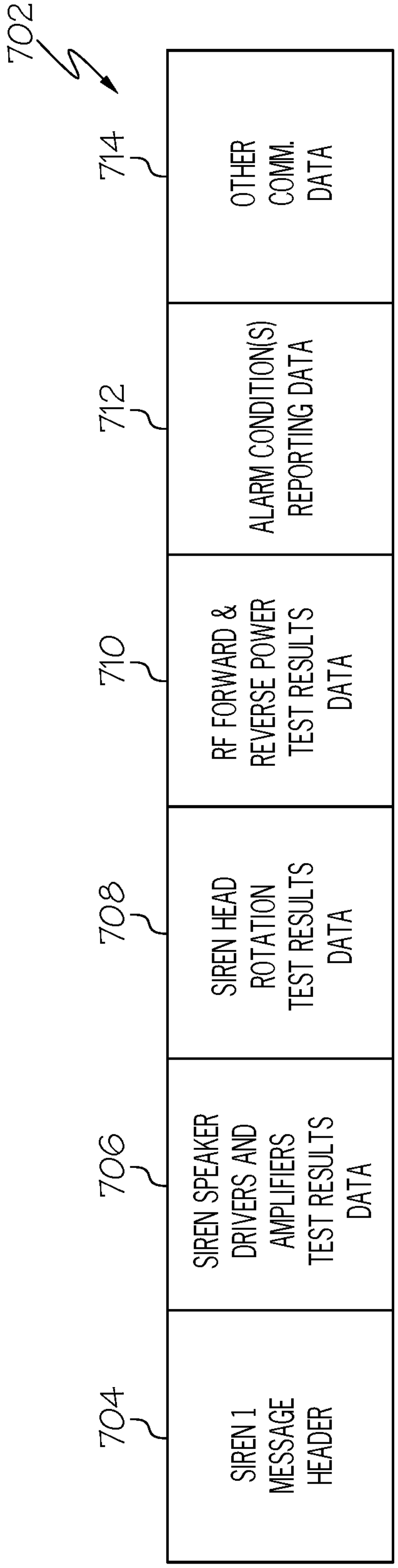
FIG. 7A is a data block diagram illustrating an example of a rotating siren operational status message, according to various embodiments of the invention.
Figure 7B:
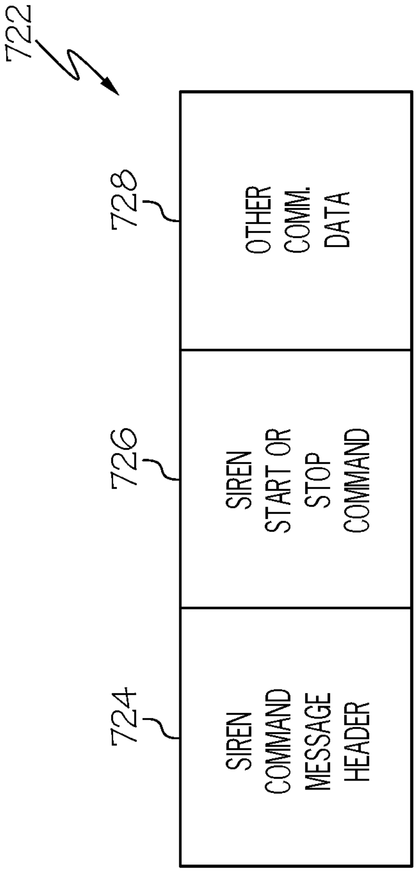
FIG. 7B is a data block diagram illustrating an example of a siren Start/Stop Command Message, according to various embodiments of the invention.

According to various embodiments, a process for automatic maintenance testing siren equipment at a remote siren site is started, for example, by a central siren control system, also referred to as a Nuclear Share-Point information processing system, a Nuclear Share-Point Control System, and a CSCS, and the like, transmitting a start siren test script command, such as shown in FIG. 7B, to a test set computer processing system (Test Set) at a remote siren site. In certain embodiments, the central control information processing system can contemporaneously send a start siren test script command to each of a multiplicity of Test Sets at various remote siren sites. The Test Set receives the start command and in response resets its test scripts and activates a test mode in the siren equipment (Siren) at the remote siren site. The Test Set is operationally coupled (and communicatively coupled) with the Siren at the remote siren site. The Siren is activated to start a Siren test mode which can be also referred to as an Automated Maintenance process, for example, using a Maintenance Macro script from the Test Set, which can be transmitted over a radio control channel for controlling the Siren. This can be the same RF channel that is used to activate the Siren in any of its applications for Maintenance, Testing, or Emergency Activations. Once the Siren begins to operate the Automated Maintenance process is activated. The Siren Test set is activated to begin monitoring and collecting sensor data outputted from various sensors. The Test Set, according to certain embodiments, can be communicatively coupled to a local Site system controller to collect certain test results and optionally certain sensor data outputted from various sensors. The Test Set can be directly connected to the local Site system controller, for example, via an Ethernet connection on the local Site system controller. Optionally, the Test Set can communicate with the local site system controller via an ABB Mesh Radio connection, or other wireless communication channel, that might be available in the local Site system controller.

The Maintenance Test process can be performed from a predetermined remote location or at the local Siren site. The process begins with monitoring the data from the local Site controller and downloading the monitored data to the siren Test Set; the downloading continuing until the Maintenance Macro script is completed.

The data obtained from a Main Voltage/Current sensor during the Maintenance process contains the Total DC voltage and DC current measured from a power supply of the siren during the Maintenance process. The predefined expected voltage, for example, can be between 21 and 25 volts, and the predefined expected current during this process, for example, can be between 80 and 90 amps. If the sensed voltage and current values are not the expected values, then the Test Set proceeds according to the process to set an alarm condition which will be transmitted and reported to the central siren control system (also referred to as the Nuclear Share-Point information processing system, the CSCS, and the like). The alarm condition(s) reporting process will be discussed more fully below.

Voltage and current sensors, for example, can be used for monitoring the total voltage and current measured (sensed) from the power supply of the siren. From these sensed and measured values, according to the example, the Test Set can determine if all the amplifiers and speaker drivers are functioning correctly in the siren. Also, from these sensed and measured values, in the present example, the Test Set can determine whether the batteries (e.g., which may be used for back-up power, or for main operational power, of the siren) are charged and in a safe operating condition. See, for example, graph curves 502 shown in FIG. 5. During this process after the siren is determined to be no longer sounding, the Test Set can verify that the battery charger is functioning correctly. That is, the Test Set can determine whether the batteries are in a safe operating condition.

If the sensed/measured voltage and current values are not the expected parameter values, then the Test Set proceeds according to the process to set an alarm condition which will be transmitted and reported to the Nuclear Share-Point information processing system. The Test Set senses and measures voltage and current values and records (stores) the values and any determined alarm condition in a data storage repository in the Test Set for transmission (reporting) to the Nuclear Share-Point information processing system. The sensed/measured operational parameter values, and any alarm condition(s), are reported according to a process that will be discussed more fully below.

A Rotor Sensor monitors the rotation of the siren head. The voltage and current operational parameters sensed and measured by the Rotor Sensor, for example, can be specified as a predefined voltage range from 23 volts to 25 volts, and can be specified as a predefined current range from 2.5 amps to 4 amps. See, for example, graph curves 504 shown in FIG. 5.

The siren head rotation can be monitored in various ways. As one example, the Test Set can monitor the time it takes to make a full rotation along with the positive current and negative current sensed and measured during the full rotation. The siren, for example, rotates in a clock-wise rotational direction. The process, accordingly, will expect a positive current and in the counter-clock-wise rotational direction the process will expect a negative current. If the values recorded are not the expected results the process is alarmed. If the Test Set senses and measures voltage and current values that are not the expected operational parameter values, then the Test Set proceeds according to the process to set an alarm condition. The Test Set senses and measures voltage and current values and records the values, and any determined alarm condition, in a data storage repository in the Test Set for transmission to the Nuclear Share-Point information processing system. The sensed/measured operational parameter values, and any alarm condition(s), reporting process will be discussed more fully below.

The Radio Sensor monitors the voltage and current, wherein the predefined standby voltage range is from 13 to 14.8 volts and the predefined standby current range is from 400 and 600 milliamps. See, for example, graph curves 602 shown in FIG. 6. When the siren is sending data over the operation radio network the Test Set can also monitor the radio transmit current and verify the radio is operating to specified operational parameters. If the Test Set senses and measures voltage and current values that are not the expected operational parameter values, then the Test Set proceeds according to the process to set an alarm condition. The Test Set senses and measures voltage and current values and records the values, and any determined alarm condition, in a data storage repository in the Test Set for transmission to the Nuclear Share-Point information processing system. The sensed/measured operational parameter values, and any alarm condition(s), reporting process will be discussed more fully below.

The RF Sensor monitors (senses/measures) the forward and reverse power in Watts to verify that the RF portion of the radio, radio cabling and antenna is functioning correctly. The forward and reverse power expected data values (sensed/measured) from the RF Sensor, for example, can be between 12 to 25 watts forward power and between 0 to 2 watts reflected power. If the sensed/measured forward and reverse power values are not the expect operational parameter values then the Test Set proceeds according to the process to set an alarm condition which will be transmitted and reported to the Nuclear Share-Point information processing system. The Test Set senses and measures forward and reverse power values. The Test Set then records the test results values, and any determined alarm condition, in a data storage repository in the Test Set for transmission to the Nuclear Share-Point information processing system. The sensed/measured operational parameter values, and any alarm condition(s) (e.g., one or more alarm condition indications), reporting process will be discussed more fully below.

If any sensed/measured and reported data value is not within the expected operational parameter values range(s), then maintenance technicians will be dispatched to the Siren site to make the necessary repairs to the Siren. Thereafter, the Siren unit will be re-tested and a Maintenance document for logging the testing of the particular Siren site will be updated with the correct sensed/measured operational parameter values.

Once the siren test maintenance process is finished, and all sensed/measured data values are populated in a Maintenance log document which appears correct, the record of the Maintenance of the particular Siren can be transferred to the nuclear share-point site and recorded complete for the Siren that was worked on. The sensed/measured and recorded data is downloaded (reported) electronically to the Nuclear Share-Point site information processing system using this process.

Advantages Over the Prior Art

In a conventional nuclear power plant emergency preparedness alert notification system, for example, two Nuclear Power Plant sites located over 100 miles apart may operate over 140 Siren systems between both Nuclear Power Plant sites. Each of the Sirens requires periodic (formerly manual) safety inspections and, as necessary based on the inspections, may require maintenance as necessary. Maintenance on nuclear power plant siren systems is fairly expensive and requires in most cases at least two technical personnel traveling to each Siren site. According to various embodiments of the present invention, the inspections and at least some of the maintenance can be done remotely without traveling to each Siren site. By using this novel remote test and maintenance process, in accordance with various embodiments, using a Test Set and a set of sensors installed in each Siren site, it reduces the overall maintenance time and reduces the chance of a human performance event error. Further, this process is much safer and efficient for technical personnel that are tasked with performing the test and maintenance work for all the Sirens dispersed over diverse wide geographic regions. Additionally, this streamlined siren test and maintenance process reduces costs of test and maintenance functions for an overall nuclear power plant operation.

Descriptions of Various Embodiments of Systems and Methods

Figure 1:
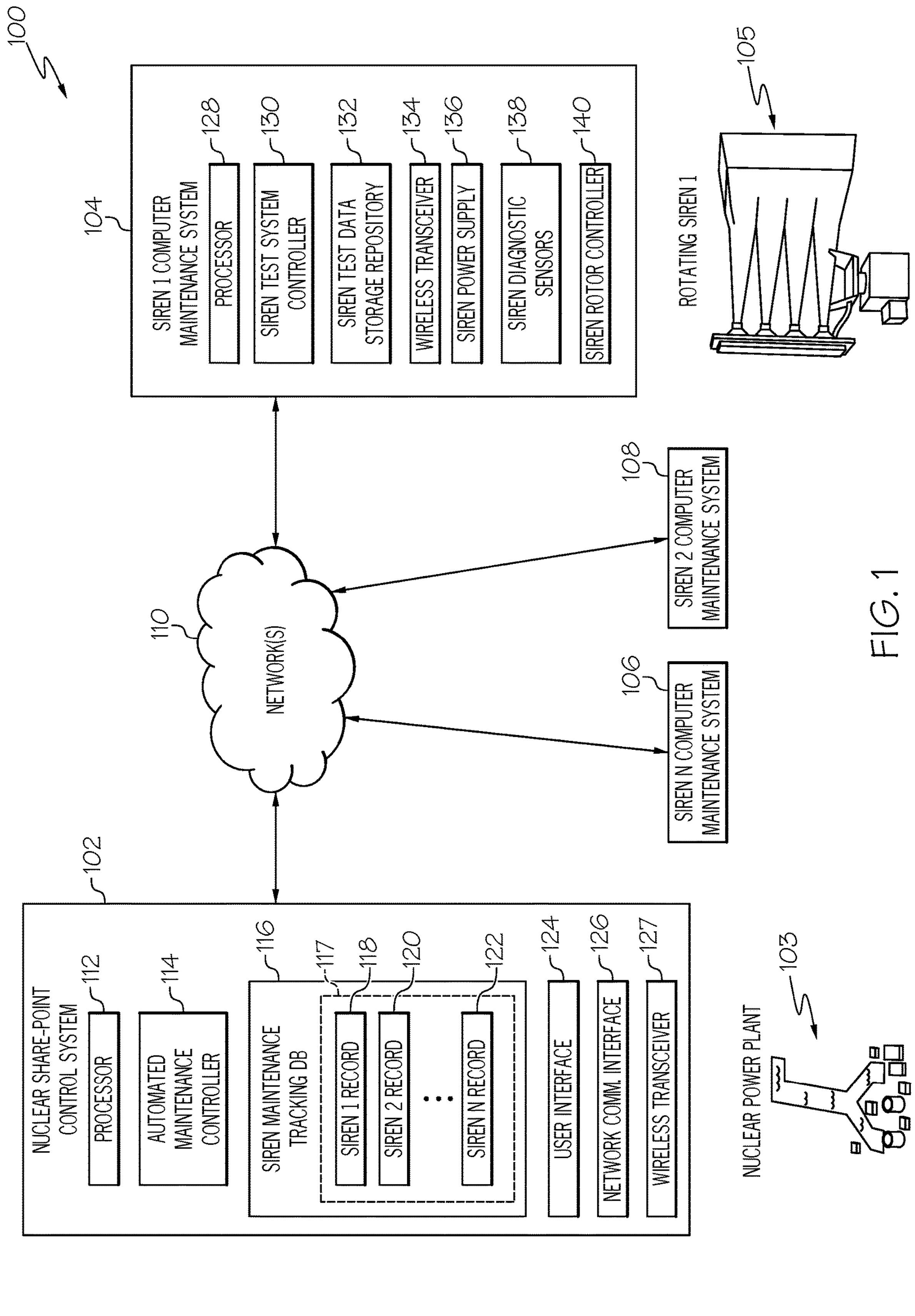
FIG. 1 is an illustrative example of a rotating siren test system distributed over diverse wide geographic regions, according to various embodiments of the invention.

Referring now to the example shown in FIG. 1, according to various embodiments, an automatic remote siren test system (System) 100 includes a central siren control system (also referred to as a Nuclear Share-Point Control System, a CSCS, and the like) 102, which comprises an information processing system that is associated with at least one nuclear power plant 103 being monitored for possible nuclear power plant alarm conditions. It should be noted that in certain embodiments a CSCS 102 can be associated with a plurality of nuclear power plants 103.

A plurality (e.g., a multiplicity) of remotely located test set computer systems (each also referred to as a Test Set, a Siren Computer Maintenance System, Remote Siren Equipment Test System, and the like) 104, 106, 108, are communicatively couple via at least one communication network 110, as illustrated in FIG. 1, with the CSCS 102. Each Test Set 104, 106, 108, is operationally coupled to a respective each of a plurality (e.g., a multiplicity) of remotely located siren equipment (each may also be referred to as a Siren, a Rotating Siren, a Siren Site, and the like) 103 (also see the example rotating siren 201 shown in FIG. 2). The plurality (e.g., multiplicity) of remotely located Sirens 105/201 can be, for example, dispersed over diverse wide geographic regions having great extent or range.

According to various embodiments, the Remote Siren Equipment Test System (Test Set) can be retrofitted to a pre-existing Siren site as a retrofit solution that can be added, for example as aftermarket equipment or otherwise, to Rotating Siren equipment that might be already deployed in a Nuclear Power Plant Emergency Preparedness Alert Notification System. The retrofit solution allows adding the Test Set equipment to each Rotating Siren while the Nuclear Power Plant Emergency Preparedness Alert Notification System continues being operational providing alert notifications via other operational Rotating Sirens that are not currently being retrofitted with, e.g., aftermarket or otherwise, Test Set equipment. This retrofit installation of Test Set equipment to Siren sites minimizes downtime of the overall Nuclear Power Plant Emergency Preparedness Alert Notification System, which is a critical requirement to continuously maintain safety of operations for one or more nuclear power plants being monitored by the Nuclear Power Plant Emergency Preparedness Alert Notification System. The Test Set includes one or more sensor units that, according to the example, can be electrically and mechanically coupled by technical personnel (e.g., in a retrofit install operation) to respective various components to be monitored in a Rotating Siren site.

According to certain embodiments, a Test Set includes information processing system and related computer electronic circuits and devices, that are generally contained in one or more housings which can be secured by technical personnel to, for example, a pre-existing Rotating Siren during a retrofit installation operation. The one or more sensor units 138 (see FIG. 1) have sensor outputs that can be communicatively coupled to the information processing system and related computer electronic circuits and devices of a Test Set.

In certain embodiments, one or more sensors have sensor inputs that are also communicatively coupled with the information processing system and related computer electronic circuits and devices of the Test Set. These one or more sensors (also referred to as configurable sensors, remotely configurable sensors, controllable sensors, remotely controllable sensors, and the like) can receive configuration data and control data from the information processing system and related computer electronic circuits and devices. The configuration data and control data, optionally, can be transmitted from the CSCS 102 to each Test Set and thereby to each set of remotely configurable sensors and/or remotely controllable sensors.

By being able to retrofit Test Sets, including in certain embodiments of the invention retrofitting by technical personnel, sets of configurable sensors and/or controllable sensors, in each of the Sirens it allows a flexible and dynamic deployment and management of automated Test Sets in a multiplicity of remote Siren sites in a Nuclear Power Plant Emergency Preparedness Alert Notification System. The term "retrofitting by technical personnel" as used herein is intended to mean adding one or more sensors by coupling to at least one component of a rotating siren system, or more generally adding a Test Set to the rotating siren system, after the rotating siren was manufactured. Often, but not necessarily, this retrofitting installation (adding) of a Test Set and/or a set of sensors to a rotating siren system, is performed by technical personnel in the field such as at a rotating siren site in a multiplicity of rotating siren sites distributed over diverse wide geographic regions in a nuclear power plant emergency preparedness alert notification system. In certain embodiments, the configurable sensors and/or controllable sensors can be remotely adjusted, configured, and controlled, e.g., from the CSCS 102, for monitoring particular components of remotely located Rotating Sirens. Particular components of each Siren site, for example, may change (e.g., drift) in operational parameters, while still being affirmatively operational, during the operational life of such particular components in the Siren site. Such remote adjustment, configuration, and control, of automated Test Sets that are monitoring certain components in each Siren site, further enhances the flexibility of deployment and management of automated Test Sets in a multiplicity of remote Siren sites, even while an overall Nuclear Power Plant Emergency Preparedness Alert Notification System continues to be operational.

The CSCS 102, according various embodiments of a siren test method, can transmit (e.g., wirelessly transmit) a start siren test script command message (also referred to, according to the context used, as a Start/Stop Command Message, a Start Command Message, a Start Command, a Siren Stop Command Message, a Stop Command, and the like) 722, such as shown in FIG. 7B, to each Test Set in the plurality (e.g., multiplicity) of Test Sets 104, 106, 108. For example, each Test Set is identified by its unique selective address in at least one network 110. The CSCS 102 transmits, according to the example, a wireless data packet 722 that is destined for reception by (e.g., that includes a header portion 724 containing a unique selective address associated with) a Test Set in the plurality (e.g., multiplicity) of Test Sets. The wireless data packet 722, in the example, also includes a siren start test script command 726, and may also include other communication data 728 for delivering the start siren test script command message 722, including the siren start test script command 726, to each Test Set in the plurality (e.g., multiplicity) of Test Sets. Optionally, the CSCS 102 can contemporaneously transmit a plurality of wireless data packets 722 that each is destined for reception by (e.g., includes a header portion 724 containing a unique selective address associated with) a respective each of the plurality (e.g., multiplicity) of Test Sets. In certain embodiments, a CSCS 102 could transmit a single wireless data packet 722 that is destined for reception by (e.g., includes a header portion 724 containing a unique selective address associated with) all of the plurality (e.g., multiplicity) of Test Sets.

The CSCS 102, according various embodiments, can wirelessly transmit a siren stop command message (also referred to as a Stop Command Message, a Stop Command, and the like) 722, such as shown in FIG. 7B, to each Test Set in the plurality (e.g., multiplicity) of Test Sets 104, 106, 108. For example, each Test Set is identified by its unique selective address in at least one network 110. The CSCS 102 transmits, according to an example, a wireless data packet 722 that is destined for reception by (e.g., that includes a header portion 724 containing a unique selective address associated with) a Test Set in the plurality (e.g., multiplicity) of Test Sets. The wireless data packet 722 also includes a siren stop command 726, and may also include other communication data 728 for delivering the siren stop command message 722, including the siren stop command 726, to each Test Set in the plurality (e.g., multiplicity) of Test Sets. Optionally, the CSCS 102 can contemporaneously transmit a plurality of wireless data packets 722 that each is destined for reception by (e.g., includes a header portion 724 containing a unique selective address associated with) a respective each of the plurality (e.g., multiplicity) of Test Sets. In certain embodiments, a CSCS 102 could transmit a single wireless data packet 722 that is destined for reception by (e.g., includes a header portion 724 containing a unique selective address associated with) all of the plurality (e.g., multiplicity) of Test Sets. It should be noted that the Stop Command Message 722 will stop all operations (also referred to as kill all operations, and the like) at the selected destination Test Set and its associated Siren 103/201. The operations of the selected Siren 103/201, in response to receiving the Siren Stop Command 726 at the particular Test Set associated with the Siren 103/201, will be stopped by a Siren system controller at the Siren site. This stop of all operations at the Siren system controller and Siren site 103/201, can then be followed by a restart (and reset) of operations of the Siren site, which will bring the Siren site 103/201 back to a known operating state.

According to certain embodiments, the restart (reset) of operations can be triggered by a wirelessly transmitted message from the CSCS 102 to the Test Set and thereby a restart signal is sent to the Siren system controller thereby restarting and resetting all operations of the siren to an initial operational state. Optionally, a pre-configured time-delay associated with the Siren system controller following the Siren Stop Command 722 will trigger the restart (reset) of operations at the Siren site thereby restarting and resetting all operations of the siren to an initial operational state. For example, the trigger can be based on a processor detecting a timer has counted down a pre-configured amount of time following wirelessly receiving a siren stop command message. Optionally, according to certain embodiments, this time-delay can be configured and associated with the Siren system controller by a wirelessly transmitted message from the CSCS 102 to the Test Set which sends a restart signal to the Siren system controller thereby restarting and resetting all operations of the siren to an initial operational state. This Siren Stop Command message 722 can be sent from the CSCS 102 to one or more (or to all) Siren sites 103/201. By stopping operations of one or more (or all) of the Siren sites 103/201, the CSCS 102 can quickly recover to normal operations an entire system 100 from a system operation failure at any one or more Siren sites, or due to a malicious (likely illegal) system hack attack by nefarious attacker(s). Advantageously, in various embodiments, the one or more networks 110 and the network communication interface devices 126, 416, (which can also be referred to as a wireless network interface device when a context in the discussion indicates wireless communication of messages) are all designed for reliable mesh networking communications, and optionally self-healing mesh networking, to increase the ability of the system 100 to recover from attacks to the network(s) 110. Besides using the various Siren sites (as network nodes) for mesh networking communications with each other and with the CSCS 102, strategically located wireless repeaters (nodes) can increase the reliability of delivering messages between the various nodes in a mesh network used by the system 100.

In the current example, for simplicity the discussion will refer to the CSCS 102 sending a Start Command message (also referred to as a start siren test command, a start test command, and the like) to the Siren 1 Test Set 104 which is coupled with Siren 1 103/201. However, it is understood that a similar method of communication and testing can be done with each and every Test Set in the plurality (e.g., multiplicity) of Test Sets 104, 106, 108, respectively coupled with the various Sirens 1, 2, N 103/201.

The CSCS 102 is communicatively coupled with the one or more networks 110. Such networks 110 can include one or more of wired networks, wireless networks, local area networks, wide area networks, specialized communication network links, or any combination thereof. According to the example shown in FIG. 1, the one or more Test Sets 104, 106, 108, are communicatively coupled with the one or more networks 110.

An example of a CSCS 102 is illustrated in FIG. 1. The CSCS 102 includes a processor 112 communicatively coupled with an automated maintenance controller 114 and with a Siren Maintenance Tracking database 116. The automated maintenance controller 114 controls the start of a siren testing process by each of the one or more Test Sets 104, 106, 108, and collects test results data and alarm condition(s), if any, reported by, and received from, each of the one or more Test Sets 104, 106, 108, as will be discussed more fully below.

The Siren Maintenance Tracking database 116 contains a multiplicity of Siren Records 117 to track the testing and maintenance history of each of the multiplicity of Sirens as reported by the one or more Test Sets 104, 106, 108. That is, for example, Siren 1 Record 118 is associated with the testing and alarm conditions reported by the Siren 1 Test Set 104, Siren 2 Record 120 is associated with the testing and alarm conditions reported by the Siren 2 Test Set 108, and Siren N Record 122 is associated with the testing and alarm conditions reported by the Siren N Test Set 106.

According to various embodiments, the number of Sirens and respective Siren Test Sets can be a multiplicity, such as at least ten Sirens and respective at least ten Siren Test Sets. The multiplicity, according to certain embodiments, can be at least fifty Sirens and respective Siren Test Sets. In some embodiments, the multiplicity can be at least one hundred Sirens and respective Siren Test Sets.

In the present example, the CSCS 102 includes a user interface 124 which technical personnel can use to monitor test and maintenance status, and operational readiness, of each of the Sirens as diagnosed and reported by the one or more Test Sets 104, 106, 108.

A network communication interface 126 (which can also be referred to as a wireless network interface and a wireless network interface device when a context in the discussion indicates wireless communication of messages) in the CSCS 102 provides hardware/software for facilitating network communications over the one or more network(s) 110 between the CSCS 102 and the one or more Test Sets 104, 106, 108. A wireless transceiver 127 in the CSCS 102 provides hardware/software for facilitating wireless communications between the CSCS 102 and the one or more siren system controllers at the respective one or more Siren sites 103/201. It should be noted that, according to certain embodiments, the wireless communications between the transceiver 127 in the CSCS 102 and the wireless transceiver 134 at each Siren site 103/201, can include communications over the one or more networks 110.

A Siren Test System Controller 130, interoperating with the processor(s) 128 in the Siren 1 Test Set 104, can communicate, for example, via the networks 110 to receive messages from, and send messages to, the CSCS 102. The Siren Test System Controller 130 is associated with one or more selective addresses stored in non-volatile storage memory (persistent memory) in the Siren 1 Test Set 104. A message sent, by the CSCS 102, in the networks 110 includes a selective address, typically in a header portion of the message. The Siren 1 Test Set 104, via the Siren Test System Controller 130, monitors message communications from the networks 110 and determines that a particular message is destined for reception by the Siren 1 Test Set 104, based on comparing a selective address included in a particular message to the one or more selective addresses stored in the local storage memory and finding a match between the message selective address included in the particular message and one of the one or more selective addresses stored in the storage memory. Such a message may also be referred herein as being addressed (also referred to as being selectively addressed) and destined for reception by the Siren Test System Controller 130 in the Siren 1 Test Set 104.

According to the present example shown in FIG. 1, the automated maintenance controller 114 in the CSCS 102 can receive a message, such as a siren test response message (also referred to as a rotating siren status message, rotating siren operational status message, and the like) 702, from the Siren 1 Test Set 104. The siren test response message 702 is selectively addressed and destined for reception by, in this example, the automated maintenance controller 114 in the CSCS 102. The siren test system controller 130 previously sent the siren test response message into the network 110 wherein the message has been selectively addressed and destined for reception, via the network 110, by the CSCS 102. In similar fashion as described above, each Test Set 104, 106, 108, can exchange messages with the CSCS 102 via the one or more networks 110.

After the Siren Test System Controller 130 has determined that the message being transmitted in the network(s) 110 is selectively addressed and destined for reception by the Siren Test System Controller 130, the Siren Test System Controller 130 receives the message and stores it in memory 404, 406, in the Siren 1 Test Set 104.

Additionally, in response to receiving the message according to this example, the processor 128 interoperates with the Siren Test System Controller 130 to perform any command(s) received from the automated maintenance controller 114 in the CSCS 102. In response to receiving a Start Command message, for example, the Siren Test System Controller 130 resets all tests of operational parameters to configured values and proceeds to start a siren test method of the Siren 1 Test Set 104 which is operationally coupled with the Siren 1 in the system 100.

After all tests of the Siren 1 are completed by the Siren 1 Test Set 104, the siren test system controller 130 generates, according to an example, an automatic test results response message 702, such as shown in FIG. 7A. The generated automatic test results response message 702 includes a selective address of the CSCS 102 for reception by the automated maintenance controller 114 in the CSCS 102. This selective address is typically included in a header portion of the test results response message to be reported (transmitted) for reception by the CSCS 102. This selective address information indicates that the automatic test results response message 702 is selectively addressed and destined for reception in the networks 110 by the automated maintenance controller 114 in the CSCS 102.

Figure 5:
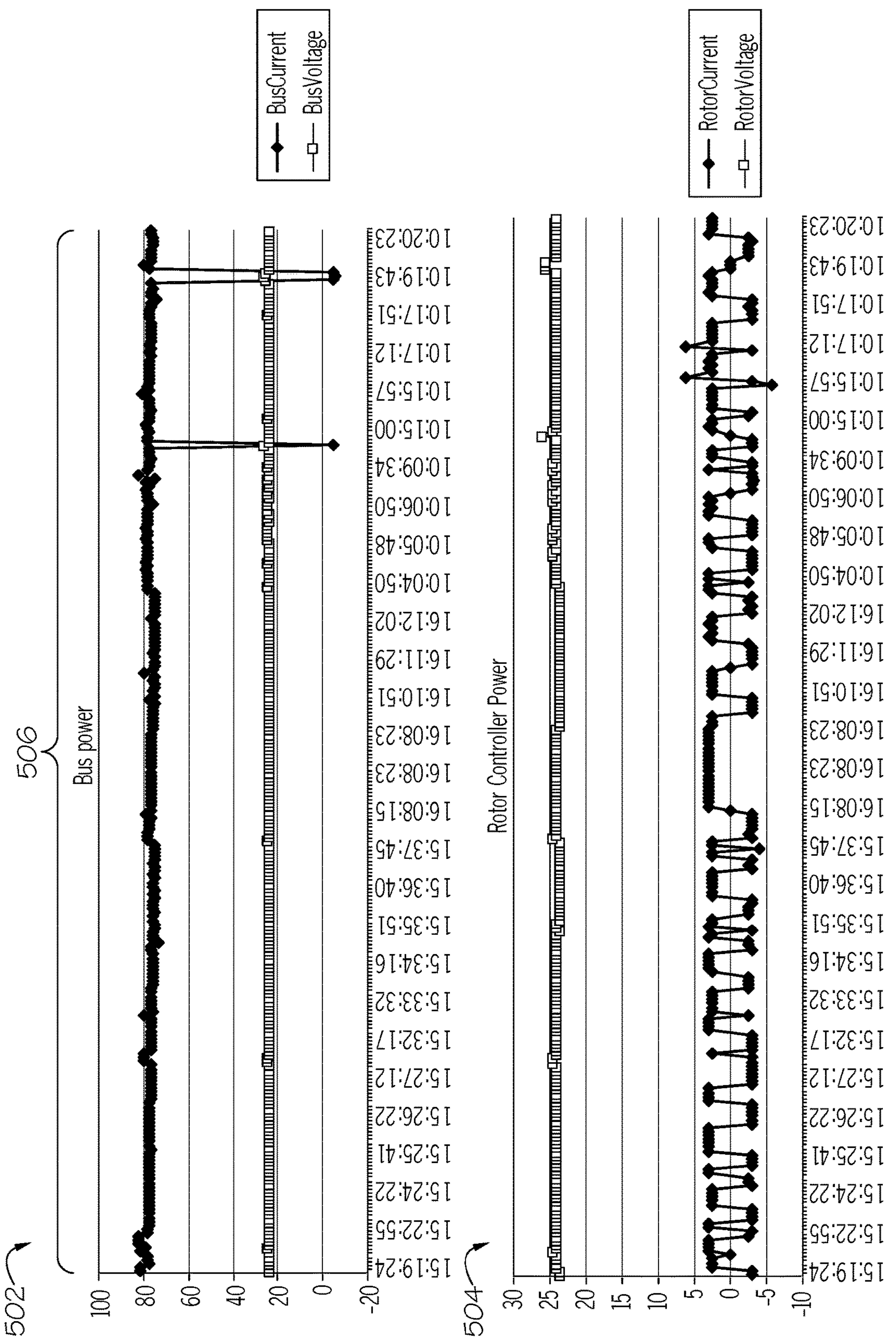
FIG. 5 is a first set of data graphs illustrating a first example of test results data collected by the remote siren equipment test system shown in FIG. 1, according to various embodiments of the invention.
Figure 6:
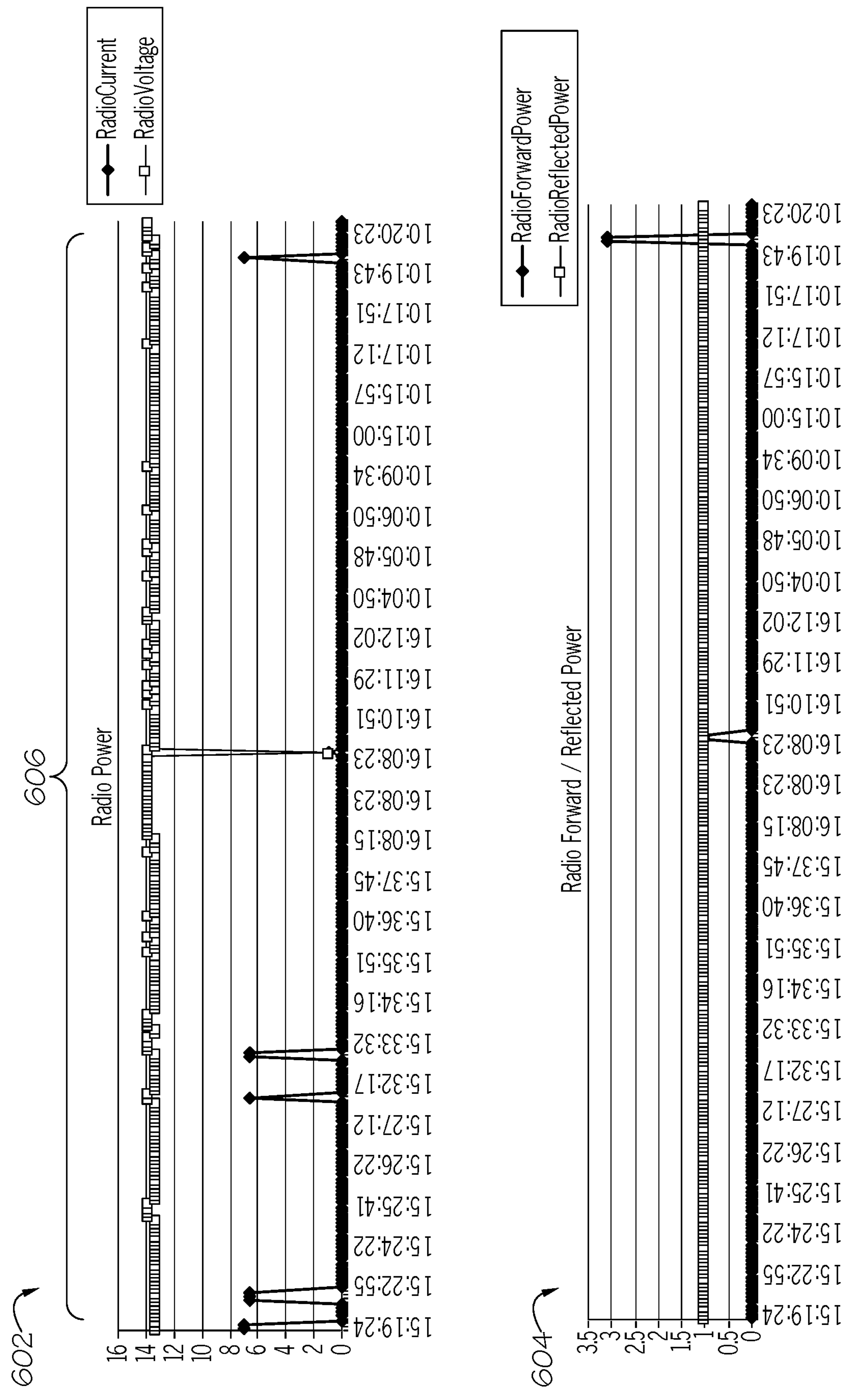
FIG. 6 is a second set of data graphs illustrating a second example of test results data collected by the remote siren equipment test system shown in FIG. 1, according to various embodiments of the invention.

The automatic test results response message 702, according to an example, includes the test results information and alarm conditions, if any, collected by, and stored in the Siren test data repository 132 in, the Siren 1 Test Set 104. The Siren 1 Test Set 104, for example, can collect voltage, current, and RF power information (also referred to as sensor data, and the like), from various components of the Siren 1. For example, Siren 1 Test Set 104 can collect outputted sensor data from Siren diagnostic sensors (also referred to as Siren Sensors, Sensors, or the like) 138 that can be operatively coupled with, for example, at least one Siren Power Supply 136 (monitoring voltages and currents 502 over time 506 as shown in FIG. 5), a Siren Rotor Controller (also referred to as actuator driver circuit, and the like) 140 (monitoring voltages and currents 504 over time 506 as shown in FIG. 5), and a Wireless Transceiver 134 (monitoring voltages and currents 602 over time 606 as shown in FIG. 6, and monitoring radio forward power and reflected power 604 over time 606 as shown in FIG. 6).

Other types of outputted sensor data from various sensors 138 can be collected by the Siren 1 Test Set 104 from various components of the Siren 1. As first example, outputted sensor data can be collected from sensors monitoring the rotational motion of the rotating siren head (also referred to as a rotating motion actuator) 206 which causes rotation of the sound output siren horn 214 (also referred to as a directional sound output port, a rotating sound output port, and the like) to thereby emit an audible emergency alert signal in a near omnidirectional sound output pattern from the rotating siren. A processor 128, for example, can monitor digital output signals from one or more rotary encoders mechanically coupled to the rotating siren head 206. The monitored digital output signals, according to the present disclosure, would be considered sensor output from one or more sensors coupled to the rotating siren head 206. Rotary encoders are a type of sensor that measures the rotation of a mechanical shaft. Such rotary encoders, for example, can be implemented using optical, mechanical, or magnetic, sensors that output digital sensor data to indicate rotation of the siren head 206 in the siren equipment 103/201.

As a second example, voltage and/or current signals being supplied by the rotating siren power supply 136 to an actuator driver circuit and to the rotating siren head (rotating motion actuator) 206 can be sensed, measured, and monitored by the processor 128. In response to being actuated by the actuator driver circuit, the rotating motion actuator (siren head) 206 rotates thereby causing the directional sound output port (sound output siren horn) 214 to rotate (e.g., up to 359 degrees) to thereby near omnidirectionally emit the audible emergency alert signal from the rotating directional sound output port 214. See, for example, graph curves 504 shown in FIG. 5. The sensor data output signals from the voltage and/or current sensor(s), which are electrically coupled to the rotating siren power supply 136, can be measured, for example, to determine amplitude of the signals, which may indicate positive amplitude or negative amplitude based on a direction of rotation of the siren head rotor (rotating motion actuator) 206. The sensor data output signals from the voltage and/or current sensor(s) can optionally also be measured for timing of the signals relative to each other and/or relative to other signals detected (or generated) by the Test Set 104. For example, the relative timing of the sensed voltage and/or current signals can indicate that the rotating motion actuator 206 is rotating the sound output siren horn 214 about a generally circular (or near circular) rotational path. Alternatively, the relative timing of the sensed voltage and/or current signals can indicate that the rotating motion actuator 206 has failed to rotate the sound output siren horn 214 about a generally circular (or near circular) rotational path. This would be flagged as an error condition (operational status) of the rotating siren 103/201. The amplitudes and the timing relationships of the sensed voltage and/or current signals, according to the present disclosure, would be considered outputted sensor data from one or more sensors coupled to the power supply 136 supplying power to the actuator driver circuit and to the rotating motion actuator 206.

As a third example, voltage and/or current being supplied to the batteries in a battery operated (or battery backed up) siren, can be sensed and measured and monitored by a processor 128. See, for example, graph curves 502 shown in FIG. 5. The monitored digital output signals from a voltage and/or current sensor, which can sense and measure voltage and/or current supplied to the batteries, according to the present disclosure, would be considered outputted sensor data from one or more sensors coupled to the power supply 136 supplying power to the batteries.

As a fourth example, received signal strength indicator (RSSI) output signals from a receiver portion of the wireless transceiver 134 can be monitored by the processor 128. The RSSI output signals, according to the present disclosure, would be considered outputted sensor data from one or more sensors coupled to the receiver portion of the wireless transceiver 134.

The siren test system controller 130 then, at a certain time for reporting test results data and alarm condition(s), if any, transmits the automatic test results response message 702, such as shown in FIG. 7A, from the siren test system controller 130 via the network interface device(s) 416 in the Siren 1 Test Set 104, through the networks 110 and then via the network interface devices 126 to the automated maintenance controller 114 in the CSCS 102. It should be noted that a network interface can also be referred to as a wireless network interface, and a network interface device can also be referred to as wireless network interface device, when a context in the discussion indicates wireless communication of messages.

The automated maintenance controller 114, in response to receiving the automatic test results response message 702, transfers the automatic test results response message payload information (e.g., the message information transported by the automatic test results response message 702) to the Siren 1 Record 118 in the Siren Maintenance Tracking database 116. The automatic test results response message payload information includes the test results data values, and any alarm conditions, that were collected by, and stored in the siren test data storage repository 132 of, the Siren 1 Test Set 104.

Additionally, in response to any alarm condition(s) received from the Siren 1 Test Set 104, the CSCS 102 will alert technical operation personnel at the Nuclear SharePoint facility to take remedial action(s) necessary for correcting operation of Siren 1 coupled to the Siren 1 Test Set 104. For example, response to receiving such an alert condition could include the CSCS 102 displaying an alarm message in the user interface 124. As another example, a response to receiving such an alert condition could include the user interface emitting an audible alarm signal and/or emitting a visible alarm signal such as by illuminating an indicator.

The CSCS 102 can repeat the above process for all of the Siren Test Sets 104, 106, 108. In this way, the CSCS 102 can automatically keep track in the database 116 of the current test result information received from each of the Test Sets 104, 106, 108. The CSCS 102 can provide alert information to the technical operation personnel, as necessary, based on the received current test result information received from each of the Test Sets 104, 106, 108.

In certain embodiments, the CSCS 102 can automatically keep track in the database 116 of a history of test results that are received from each of the Test Sets 104, 106, 108, over time. Each test result that is received from a Test Set 104, 106, 108, is stored by the automated maintenance controller 114 in a respective one siren record 118, 120, 122, associated with the Test Set 104, 106, 108. Time information associated with each test result can also be stored in the respective one siren record 118, 120, 122. The time information can correspond, for example, to a time when the Test Set 104, 106, 108, performed tests of components in a particular rotating siren 105. In this way, the CSCS 102 can keep track, in the siren records 117 in the database 116, of a history of test results from a plurality of rotating siren tests automatically performed by each of the respective Test Sets 104, 106, 108.

According to various embodiments, the CSCS 102 can analyze

Figure 2:
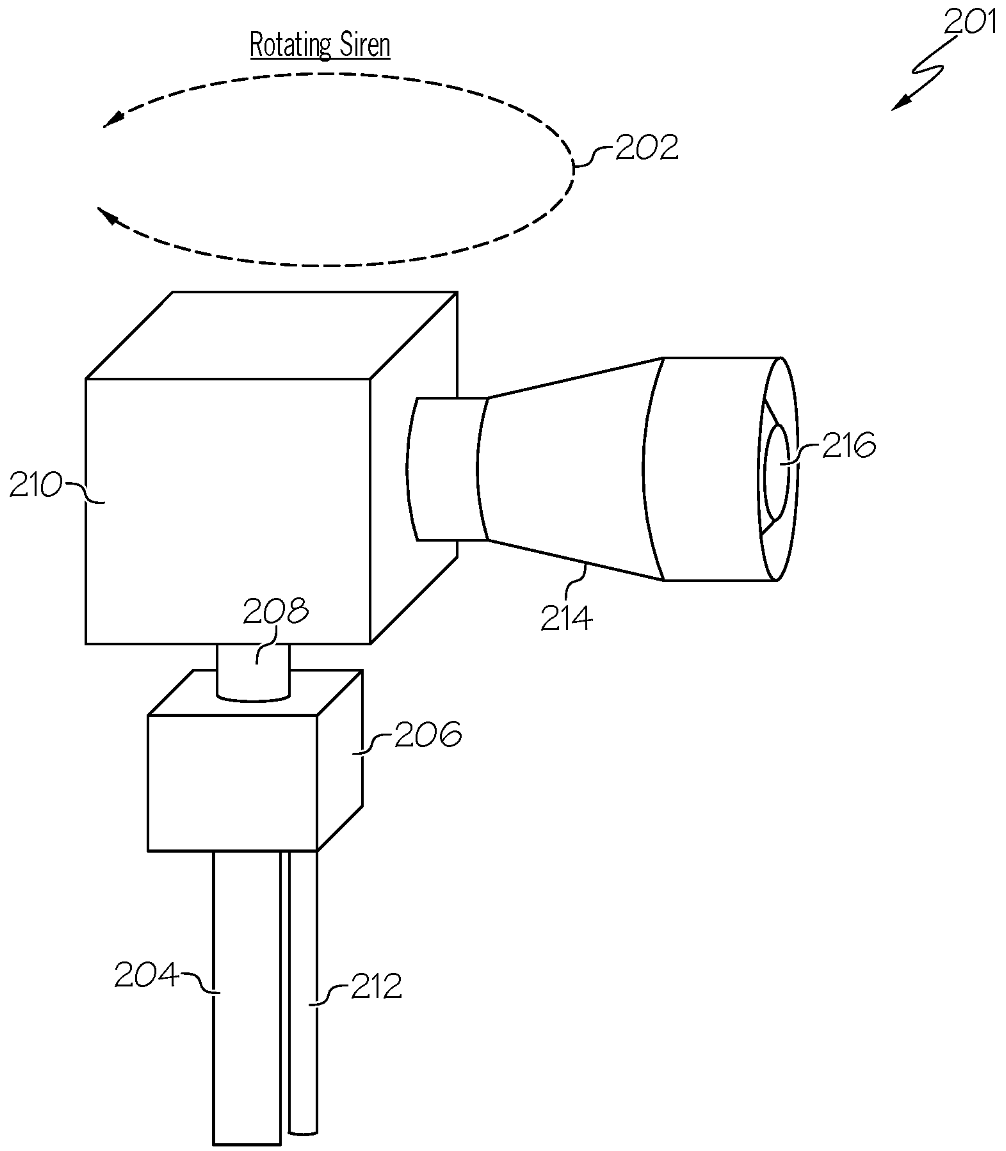
FIG. 2 is an illustrative example of a rotating siren suitable for use in the test system of FIG. 1, according to various embodiments of the invention.

Referring FIG. 2, an example of a rotating siren 201 is shown. The siren 201 includes a siren site system controller (not shown in FIG. 2), which includes various computer system components, and which controls operations and features of the particular siren site. The siren 201 includes a directional audio output via an output horn 214 and speaker(s) 216 which magnifies the output audio signal (e.g., an audible emergency alert signal) in one general direction. To significantly increase audible audio/sound output signal from the siren 201, the audio/sound output is made directional and amplified by a directional sound output port such as a horn 214. To near omnidirectionally emit the amplified directional audio/sound output (e.g., an audible emergency alert signal) from the directional horn 214 it can be rotated over approximately 359 degrees (e.g., almost a complete 360 degrees output). Accordingly, the siren 201 is considered to be rotating 202 clock-wise or counter-clock-wise, or sequentially in both rotational directions, over approximately 359 degrees as shown in FIG. 2.

The audio signal is electronically amplified and driven into the speaker(s) 216 and in response the speaker(s) 216 emit audible sound output. Then, the horn (directional sound output port) 214 mechanically amplifies the emitted sound output from the speaker(s) 216. In the example, the audio signal is amplified and driven into the speaker(s) 216 by electronic amplifier/driver circuits 210, as shown. According to one example, the electronic amplifier/driver circuits 210, the horn 214, and the speaker(s) 216, are mechanically coupled to a rotating housing, as illustrated in FIG. 2.

It should be noted that the speaker(s) 216, according to various embodiments, can be located at a different location and structure separate from the rotating housing. That is, only the horn (directional sound output port) 214 would be mechanically coupled to the rotating housing. The sound output from the speaker(s) 216 would be mechanically coupled (e.g., via a sound output channel) to the rotating horn 214, which can then amplify and directionally emit the sound output which by rotating the horn 214 can emit the sound output (e.g., an audible emergency alert signal) in a near omnidirectional sound output pattern.

The rotating housing, in this example, is supported by a support structure 208 on a rotator head (also referred to as a rotating siren head, a rotating motion actuator, and the like) 206 that can rotate in a nearly 360 degrees rotation (e.g., up to 359 degrees). For example, a stepper motor could be used to rotate the rotating housing and the rotating horn 214. In this way, for example, the audio signal is electronically amplified/driven (by the amplifier/driver circuits and the speaker(s) 216) and emitted as sound output, and which then is additionally mechanically amplified and directionally emitted by the horn 214. While the horn 214 is rotated in nearly a 360 degrees pattern it can directionally emit the sound output from the Siren 201 in a nearly omnidirectional pattern.

The siren 201 arrangement of components 206, 208, 210, 214, 216, is supported by a supporting tower 204 (or supporting beam or pole, or the like) which raises the nearly omnidirectional sound output to a significantly high altitude to transmit the omnidirectional sound output over many possible mechanical impediments that could limit the sound output; for example nearby trees or other structures that could dampen or block the sound output from the Siren 201. According to certain embodiments, a power supply and cable 212 provides electrical power to the Rotating Siren 201.

Optionally, the power could be supplied by solar power collector panels and batteries that can store electrical energy to be used as necessary by the Siren 201. Such an arrangement allows the operational Siren 201 to be located in very remote locations away from electrical power lines. Communications between such remote siren equipment 201 and a central control system 102 could be made totally using wireless communication between the Siren controller 140 and the CSCS 102 via the one or more networks 110.

Figure 3:
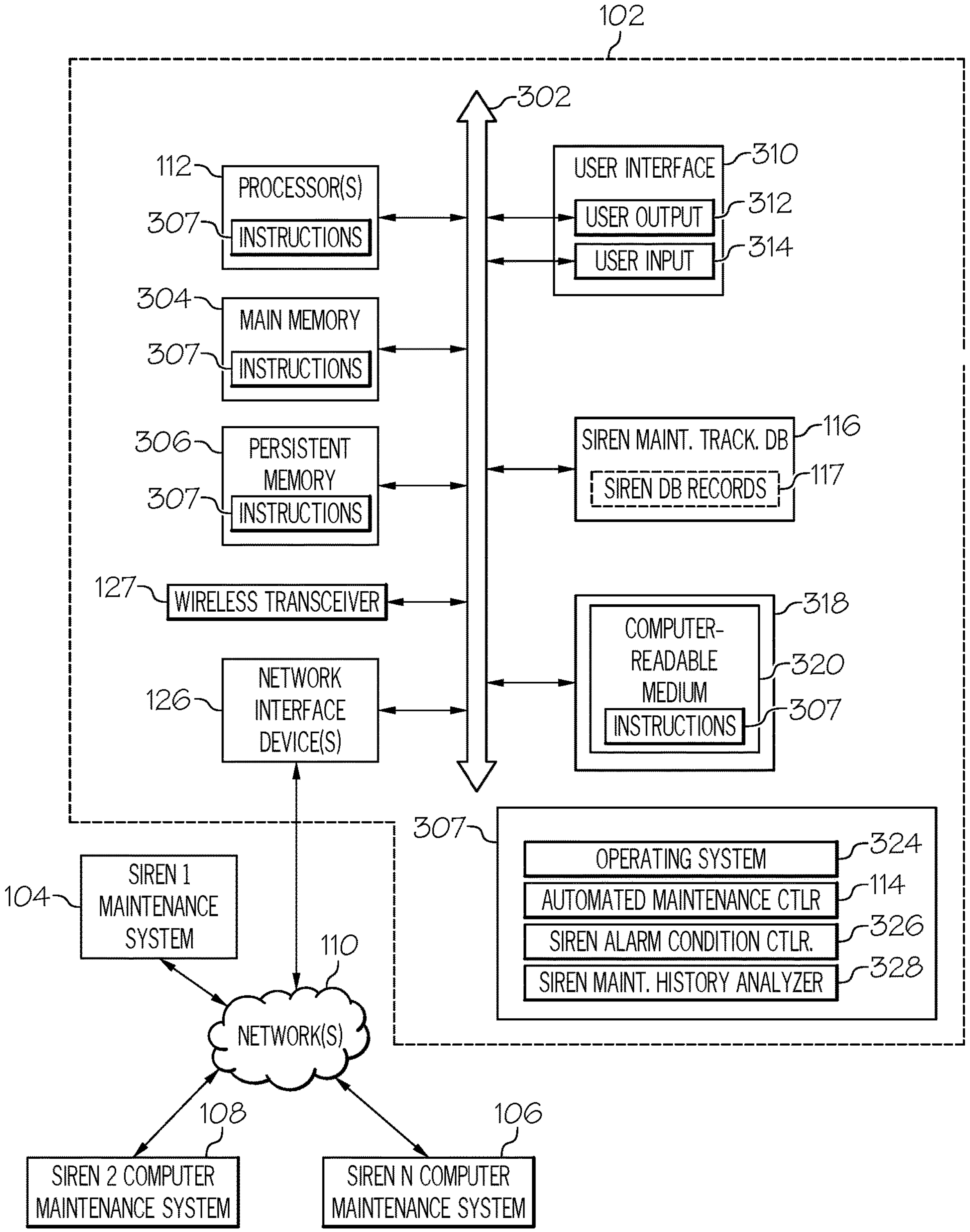
FIG. 3 is a more detailed illustrative example of the nuclear share-point control information processing system shown in FIG. 1, according to various embodiments of the invention.
Figure 4:
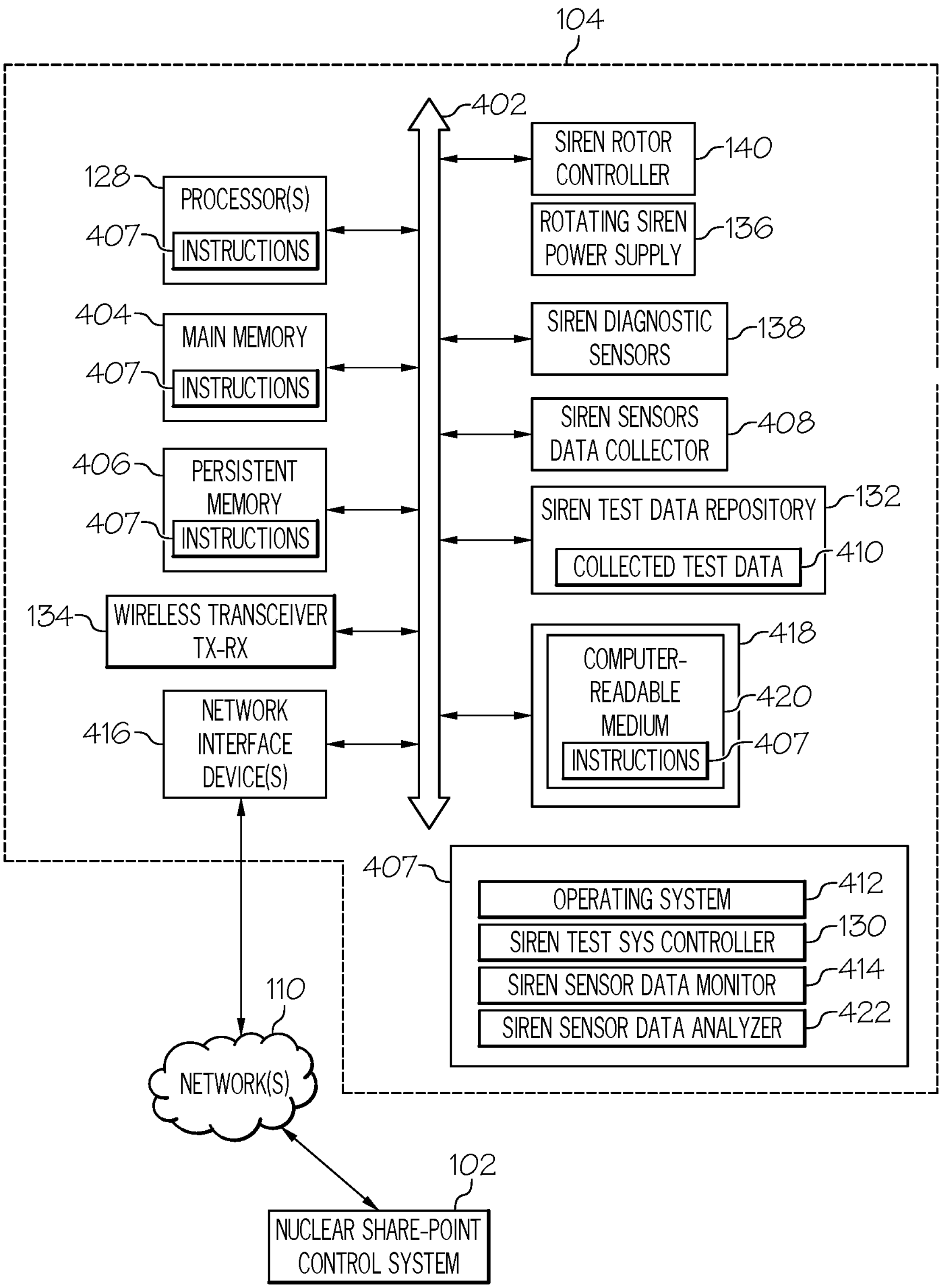
FIG. 4 is a more detailed illustrative example of a remote siren equipment test system shown in FIG. 1, according to various embodiments of the invention.

FIG. 3 illustrates a more detailed view of the CSCS 102 which has been discussed above with reference to FIG. 1. FIG. 4 illustrates a more detailed view of the Siren 1 Test Set 104 which has been discussed above with reference to FIG. 1.

Regarding FIG. 3, an example of an information processing system suitable for use as the CSCS 102 includes various components. At least one processor 112 executes instructions 307 that cause the information processing system 102 to perform operations according to various embodiments of the invention. The processor 112, in this example, is communicatively coupled with various other components of the information processing system 102 via a system bus 302. Main memory 304 contains instructions 307, which can include computer instructions, configuration parameters, and data used by the processor 112. Persistent memory 306 can store the instructions 307 in persistent storage for the processor 112.

A user interface 124, 310 includes a user output interface 312 and a user input interface 314 for communicating with a user (e.g., an operator or other technical personnel) using the information processing system 102. The user output interface 312 includes various output devices, such as a computer display device, indicator lights, a speaker that generates sound output to a user, or a data output interface device that can provide data and control signals to a user that comprises a computer system.

The user input interface 314 can include various input devices such as a computer keyboard, mouse device, touch screen display, a microphone that receives sound input signals from a user. The received sound signals, for example, can be converted to an electronic digital representation and stored in memory, and optionally can be used with voice recognition software executed by the processor 112 to receive user input data and commands. The user input interface 314 can include a data input interface device (not shown) that can receive data and control signals from a user that comprises a computer system.

A siren maintenance tracking database 116 contains a collection of siren database records 117. Examples of such records 118, 120, 122, have been discussed above with reference to FIG. 1. The database 116, according to the example, is communicatively coupled with the processor 112 in the CSCS 102.

As shown in FIG. 3, the processor 112 can be communicatively coupled with a computer-readable medium 320. The computer-readable medium 320, according to the present example, is communicatively coupled to a reader/writer device 318, which is communicatively coupled via the system bus 302 to the processor 112.

The instructions 307, which can include computer instructions, configuration parameters, and data, can be stored in the computer-readable medium 320, the main memory 304, the persistent memory 306, and the processor's internal memory such as cache memory and registers.

A network interface device 126 is communicatively coupled with the processor 112 and provides a communication interface for the CSCS information processing system 102 to communicate via one or more networks 110. The networks 110, as has been discussed above with reference to FIG. 1, can include wired or wireless networks or a combination of both, and can be any of local area networks, wide area networks, or a combination of such networks. For example, wide area networks, including the Internet and the web, can inter-communicate the information processing system 102 with other information processing systems that may be locally or remotely located relative to the information processing system 102. It should be noted that mobile communications devices, such as mobile phones, Smartphones, tablet computers, lap top computers, and the like, which are capable of at least one of wired or wireless communication, are also examples of information processing systems according to various embodiments, within the scope of the present disclosure.

A wireless transceiver 127 is communicatively coupled with the processor(s) 112 and provides a communication interface for the CSCS information processing system 102 to communicate commands and data to each of the Siren sites (siren system controller) and to receive data from each of the Siren sites. For example, the CSCS 102 can transmit a Siren activation command to start a particular remote Siren site to sound a siren alarm. The CSCS 102 can also transmit a Siren deactivation command to stop the Siren from sounding the siren alarm.

As illustrated in FIG. 3, the instructions 307 can include an operating system 324, the automated maintenance controller 114, a siren alarm condition controller 326, and a siren maintenance history analyzer 328.

The automated maintenance controller 114 interoperates with the processor 112 to cause the CSCS information processing system 102 to operate according to various novel methods that are disclosed herein. Some of the operations have been described above with reference to the example of FIG. 1, in which the CSCS information processing system 102 can automatically conduct repeated siren test and maintenance processes with each of the plurality (e.g., multiplicity) of Siren Test Sets 104, 106, 108, and thereby update the siren database records 117, in the database 116. The siren database records 117 are updated to accurately reflect the current siren testing and maintenance information, and alarm conditions, if any, of each individual rotating siren system 105 associated with the respective each of the plurality (e.g., multiplicity) of Siren Test Sets 104, 106, 108. This siren testing and maintenance information update process will be discussed more fully below.

According to the example, the Siren Alarm Condition Controller 326 determines, from testing and maintenance information received from each of the plurality of Siren Test Sets 104, 106, 108, whether an alarm condition has been detected with respect to any of the tests performed by the each Siren Test Set. That is, for example, testing and maintenance history information of each one of the multiplicity of rotating sirens is stored in a respective siren record in the siren maintenance tracking database 116. The testing and maintenance history information in each of the siren records can be continuously updated based on repeated testing of individual rotating siren systems 105 and receipt of one or more rotating siren status messages including indication of operational status of at least one component of a respective one of the multiplicity of rotating sirens associated with the individual siren records. The testing and maintenance history information in each of the siren records can be continuously analyzed based on the continuous updating of the information in the each of the siren records 117.

In response to an alarm condition being detected by the Siren Alarm Condition Controller 326, an alarm condition reporting process is performed to report the alarm condition to an operator of the CSCS 102, and/or other technical personnel, and specifically that the alarm condition has been detected with respect to a particular Siren Test Set coupled to a remote Siren. Various alert processes can be followed based on each specific alarm condition detected associated with a particular Siren Test Set and remote Siren.

The Siren Maintenance History Analyzer 328 is invoked by the CSCS 102 in response to the Automated Maintenance Controller 114 determining that testing and maintenance information received over time (e.g., testing and maintenance history information stored in each of the siren records

117) from a particular one of the Siren Test Sets 104, 106, 108, indicates sensed/measured operational parameter value(s) of particular one or more components of a rotating siren system 105 is/are deviating from expected specified operational parameter value(s), for example, by greater than one or more predetermined difference threshold values. The history of the operational parameter value(s) associated with past test results over time can be stored in each of the siren records 117 associated with a respective each rotating siren system 105 in a multiplicity of rotating siren systems. The siren testing and maintenance history information stored in each of the siren records 117 can be analyzed by the Analyzer 328 to determine a trend of the operational parameter value(s) deviating from expected specified values. The Analyzer 328 can determine if there is a trend of progressively increasing deviations from expected specified operational parameter values over time. That is, for example, test result value(s) may be determined, by the Analyzer 328, exceeding progressively over time greater than one or more predetermined threshold values for particular operational parameter value(s). In this way, the Analyzer 328 can predict a likely alarm condition that will occur in the future for a particular test result of a component of a Siren 105, 201. In response to the Analyzer 328 indicating a prediction of a likely alarm condition that will occur in the future for a particular test result, the automated maintenance controller 114 can provide a report of the prediction(s) (e.g., via a user output interface 312) to an operator of the CSCS 102 (and/or to technical personnel). In this way, the CSCS 102 can inform system technical operators that a failure in operation of a particular component in a Siren is imminent. The technical personnel, in response, can take early remedial actions to avoid an imminent failure, even before a human operator would have physically tested, and diagnosed a failure in operation of, the particular component. For example, a technical crew can be dispatched to the Siren site to either make necessary adjustment in the operation of (and in the possible configuration of) the particular component, or can outright replace the component, in the Siren, before a failure occurs.

FIG. 4 illustrates an example of an information processing system suitable for use as the Siren Test Sets 104, 106, 108. Examples of various components are also shown. The at least one processor 128 executes instructions 407 that cause the information processing system 104 (in the Siren 1 Test Set 104) to perform operations according to various embodiments of the invention. The processor 128, in this example, is communicatively coupled with various other components of the information processing system 104 via a system bus 402. Main memory 404 contains instructions 407, which can include computer instructions, configuration parameters, and data used by the processor 128. Persistent memory 406 can store the instructions 407 in persistent storage 406 for the processor 128.

A user interface (not shown) can include a user output interface and a user input interface for communicating with a user (e.g., an operator or other technical personnel) using the information processing system 104. Each of the user output interface and the user input interface, for example, can include various devices such as has been discussed above with reference to FIG. 3 regarding a user interface 310 in the CSCS 102. Descriptions of examples of specific user output interface devices and user input interface devices will not be repeated here.

A local Siren Test Data repository 132 of the Siren 1 Test Set 104 contains a collection of test data and alarm condition information 410 which has been collected by the Siren Test Set 104. Examples of such test data and alarm condition information 410 have been discussed above with reference to FIG. 1. The local Siren Test Data repository 132 can be communicatively coupled with the processor 128 via the system bus 402.

As shown in FIG. 4, the processor 128 can be communicatively coupled with a computer-readable medium 420. The computer-readable medium 420, according to the present example, is communicatively coupled to a reader/writer device 418, which is communicatively coupled via the system bus 402 to the processor 128.

In the present example, a wireless transceiver 134 is communicatively coupled via the system bus 402 to the processor 128. The processor 128 can interoperate with the wireless transceiver 134, according to various embodiments, to receive information signals (e.g., commands and data) transmitted from a wireless transceiver 127 in the CSCS 102. Examples of such various types of information signals have been discussed above with reference to FIG. 1. For example, the CSCS 102 can transmit a Siren activation command to start the Siren sounding the siren alarm. The CSCS 102 can also transmit a Siren deactivation command to stop the Siren from sounding the siren alarm. The processor 128 can interoperate with the wireless transceiver 134, according to various embodiments, to transmit information signals (e.g., Siren ON/OFF status and other Siren related data) transmitted from the Siren 1 Test Set 104 to the wireless transceiver 127 in the CSCS 102.

The instructions 407, which can include computer instructions, configuration parameters, and data, can be stored in the computer-readable medium 420, the main memory 404, the persistent memory 406, and the processor's internal memory such as cache memory and registers.

A network interface device 416 is communicatively coupled with the processor 128 and provides a communication interface for the Siren Test Set information processing system to communicate via one or more networks 110. The networks 110, as has been discussed above with reference to FIG. 1, can include wired or wireless networks or a combination of both, and can be any of local area networks, wide area networks, or a combination of such networks. For example, wide area networks, including the Internet and the web, can inter-communicate the information processing system 104 with other information processing systems that may be locally or remotely located relative to the information processing system 104. It should be noted that mobile communications devices, such as mobile phones, Smartphones, tablet computers, lap top computers, and the like, which are capable of at least one of wired or wireless communication, are also examples of information processing systems, within the scope of the present disclosure. As one example, and not for limitation, a mobile technician unit can include a transceiver to communicate messages (e.g., control and/or data signals) with each of the Sirens system controllers and/or Siren test system Controllers 130.

As illustrated in FIG. 4, the instructions 407 can include an operating system 412, the siren test system controller 130, the siren sensor data monitor 414, and the siren sensor data analyzer 422.

The siren test system controller 130 interoperates with the processor 128 to cause the Siren 1 Test Set 104 to operate according to various novel methods that are disclosed herein. Some example operations have been described above with reference to the example system 100 of FIG. 1. For example, the Siren 1 Test Set 104 can automatically receive wirelessly transmitted information signals from the CSCS 102, and store the received information in the persistent memory 406. The Siren 1 Test Set 104, in response to receiving a start test command from the CSCS 102 can operate according to one or more test scripts and may capture various test results and alarm conditions information and continuously update the information in the siren test data storage repository 132. In this way, the siren test system controller 130 maintains stored in the siren test data repository 132 a set of collected test data 410 which may include alarm condition(s) associated with the local Siren equipment. According to various embodiments, by monitoring and collecting test data and alarm condition(s) information (which may be individually and collectively referred to as collected test data 410) in the siren test data repository 132, the siren test system controller 130 can maintain collected test data and alarm condition(s) information 410 stored in the siren test data repository 132 ready to report to the CSCS 102 at a certain time for transmitting and reporting the test data and alarm condition(s).

During repeated start test command communications between the CSCS 102 and each of the plurality (e.g., multiplicity) of Siren Test Sets 104, 106, 108, the CSCS 102 sends a start test command message to each one of the Siren Test Sets 104, 106, 108, and then receives an automatic test results response message transmitted by each Siren Test Sets 104, 106, 108, in response to receiving its respective start test command message.

The CSCS 102, in this way, can continuously update the Siren records 118, 120, 122, in the database 116, with the test results and alarm condition(s) information collected by, and stored in the local repository 132 of, the each Siren Test Set 104, 106, 108.

The Siren Sensor Data Monitor 414 monitors the various siren sensors and determines when siren sensor data is ready to be collected. Typically, the siren sensor data monitor 414 interoperates with the processor(s) 128 and operates according to the test script under control from the siren test system controller 130. The siren sensor data monitor 414 interoperates with the siren sensors data collector 408 to collect sensor data from the various siren sensors and to store and update the collected test data 410 in the siren test data repository 132.

Siren sensor data is collected from the various siren sensors based on the specifications for collected sensor data according to each test of a particular component of the siren 201. For example, as has been discussed above with reference to FIGS. 1, 5, and 6, the sensor data obtained from a main voltage/current sensor during a test script sequence may contain the total DC voltage and DC current measured from a power supply 136 of the siren 201 during the test script sequence.

In a first example test, voltage and current sensor data can be collected from monitoring the amplifiers and drivers 210 of the speaker(s) 216 in the siren equipment.

In a second example test, sensor data may be sensed and measured by a rotor sensor which, as has been discussed above with reference to FIGS. 1, 5, and 6, indicates the operation of the rotating Siren 1 201 (e.g., the siren head rotation which is being monitored), based on the operation of the rotor and controller of the particular siren, e.g., Siren 1. The processor 128 in the Siren 1 Test Set 104, for example, can send an actuation signal to the rotating motion actuator to mechanically rotate the directional sound output port and contemporaneously monitor the time it takes to make a full rotation along with the positive current and negative current sensed and measured during the generally full rotation. According to another example, the processor 128 can send an actuation signal to the rotating motion actuator (rotating siren head) to mechanically rotate the directional sound output port and contemporaneously monitor digital output signals from one or more rotary encoders mechanically coupled to the rotating siren head. Rotary encoders are a type of sensor that measures the rotation of a mechanical shaft. Such rotary encoders, for example, can be implemented using optical, mechanical, or magnetic, sensors that output digital sensor data to indicate rotation of the siren head in the siren equipment 201.

In a third example test, as has been discussed above, the Test Set can send an actuation signal to the wireless transceiver 134 and contemporaneously monitor forward power and reverse power values (sensed and measured values) from the wireless transceiver 134. These sensed data values are test results from testing the transmitter portion of the wireless transceiver 134.

In a fourth example test, RSSI output signals from the receiver portion of the wireless transceiver 134 can be monitored to provide test results of the receiver portion of the wireless transceiver 134. After electrically controlling the wireless transceiver (e.g., by sending an actuation signal to the wireless transceiver 134) to receive wirelessly transmitted RF signals, for example, the processor can monitor the RSSI output from the receiver portion of the wireless transceiver 134. A transmitted RF signal, according to one example test, can be transmitted (for example from the wireless transceiver 127 at the CSCS 102) such that the receiver portion RSSI output will output an indication of an RF signal being received. The transmission (ON) of the transmitted RF signal can be temporarily paused (OFF) and then this cycle of ON-OFF can be repeated a predefined number of times over a predefined time interval. According to the example, the RSSI output signal, in response to the received cycle of ON-OFF transmitted RF signals, will comprises a plurality of RSSI output signals in an alternating signal polarity pattern (or another predefined RSSI output signal pattern) within the predefined time interval. Of course other patterns of wireless transmitted RF signals can be used as a test of the receiver portion. If a number of the RSSI output signals, during a test, fail to match an expected predefined RSSI output signal pattern, the processor can determine that the receiver portion is failing to properly operate under test. That is, the processor can determine that the receiver portion is negatively operational to receive wirelessly transmitted RF signals, based on analysis of the outputted sensor data from the RSSI output from the receiver portion of the wireless transceiver 134.

If the siren sensor data analyzer 422 determines that sensed (measured) voltage and current sensor data values are not within the expected value ranges for these measurements, or in certain embodiments the monitored digital output signals from the rotary encoder(s) are not the expected values (or the expected pattern of values, or both) within expected time frames, or in certain embodiments the monitored (sensed and measured) forward power and reverse power data values are not the expected values during the testing of the transmitter portion of the wireless transceiver 134, or in certain embodiments a monitored RSSI output signal pattern fails to match an expected predefined signal pattern during the testing of the receiver portion of the wireless transceiver 134, then the processor 128 proceeds according to the test script process to set one or more alarm condition(s), e.g., set alarm condition flag(s) representing the particular collected sensor data from a test result. Alarm condition flag(s) are set and stored in the collected test data 410 in the siren test data repository 132. These one or more alarm condition flags will be transmitted and reported, along with the other collected test data 410, to the CSCS 102 after the test script is completed by the Siren 1 Test Set 104.

FIG. 7A shows an example automatic siren test response message 702 which is typically transmitted from the Siren 1 Test Set 104 to the CSCS 102 as part of reporting test results. A header portion 704 of the message 702 includes a selective address of the CSCS 102, as has been discussed above. The selective address in the automatic siren test response message 702 makes the message 702 destined for reception, via the networks 110, by the CSCS 102.

According to various embodiments, test results data 706 from testing speaker drivers and amplifiers can be included in the response message 702. Test results data 708 from testing the siren head rotation, according to certain embodiments, can be included in the response message 702. Test results data 710 from testing the wireless transceiver 134, according to certain embodiments, can be included in the response message 702. The wireless transceiver test results data 710 can include, according to an example test script sequence, RF forward power and reverse power sensed and measured values from the transmitter portion of the wireless transceiver 134. In certain embodiments, the wireless transceiver test results data 710 can include RSSI data from the receiver portion of the wireless transceiver 134.

The message 702 can include time information (not shown), according to certain embodiments. This time information can indicate, for example, a date/time when the response message 702 was sent to the CSCS 102 by the Siren 1 Test Set 104. It can also indicate, as another example, the date/time that each of the tests was performed on the siren equipment. Other data 714 associated with reporting the test results via the response message data packet(s) 702, may be included in the response message data packet(s) 702.

The response message 702 can also include a field 712 containing the alarm condition flags collected and stored (recorded) by the siren 1 test set 104 in the storage repository 132 of the siren 1 test set 104.

Figure 8:
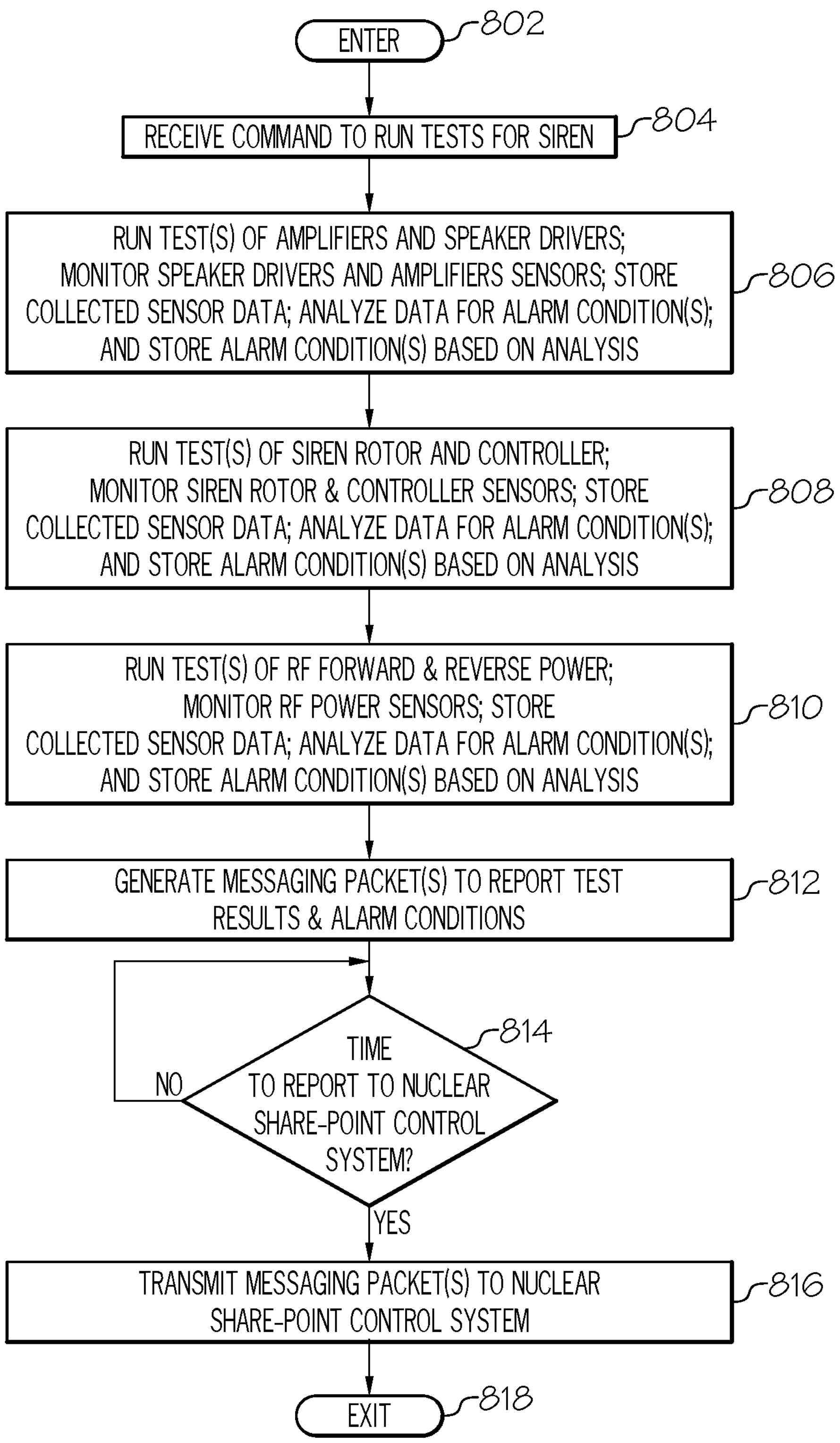
FIG. 8 is an operational flow diagram illustrating example operations of the remote siren equipment test system of FIG. 1, according to various embodiments of the invention.

Now with reference to FIG. 8, an operational flow diagram illustrates example operations of the Siren 1 Test Set 104 in the system 100 of FIG. 1, according to various embodiments of the invention.

The processor 128 in the Siren 1 Test Set 104 enters an operational sequence, at step 802, and then immediately proceeds to monitor communication in the network(s) 110 and receives a command to run test(s) for Siren 1, at step 804. In response to receiving a start test command 722, as shown in FIG. 7B, the processor 128, at step 806, according to the present example, runs test(s) of Siren 1 amplifier(s) and driver(s) 210 for driving the speaker(s) 216, collects sensor data from the amplifier(s) and driver(s) 210 under test, stores the collected sensor data 410 in the data storage repository 132, analyzes the collected data 410 to detect whether any operational parameter value is outside of expected range of indicating alarm condition(s), and stores alarm condition(s) flag(s) in the data storage repository 132 based on the analyzed collected data 410 being determined outside of expected range of values.

Then, the processor 128, at step 808, according to the present example, runs test(s) of the Siren 1 rotor motor and controller (also can be referred to as a rotating motion actuator) 206 that rotate the Siren 1 horn (also referred to as a directional sound output port) 214 which causes rotation of the output sound from speaker(s) 216. The processor 128, according to one example, collects sensor data from the rotor motor and controller 206 under test, stores the collected sensor data 410 in the data storage repository 132, analyzes the collected data 410 to detect whether any siren component operational parameter value is outside of expected range of values indicating alarm condition(s), and stores alarm condition(s) flag(s) in the data storage repository 132 based on the analyzed collected data 410 being determined outside of expected range of values.

Continuing with the testing process, according to the example, the processor 128, at step 810, runs test(s) of the Siren 1 RF forward power and reverse power at the wireless transceiver 134. The forward power and reverse power measurements indicate the operational status, either affirmatively operational or negatively operational, of the wireless transceiver 134 to wirelessly transmit data messages to the wireless transceiver 127 at the CSCS 102. At defined time interval, the transmitter portion of the transceiver 134 starts RF transmission of a test signal and then stops the transmission. This RF signal transmission ON-OFF sequence can be repeated as part of a test protocol. The forward power and reverse power can be measured during this sequence. The collection of the measurements of forward power and reverse power, in this example, are considered collected sensor data that is collected by the processor 128.

It should be noted that in certain embodiments the receiver portion of the transceiver 134 can also be tested by the Siren 1 Test Set 104. For example, a received signal strength indicator (RSSI) output signal from the wireless transceiver 134 can be monitored by the processor 128 while the wireless transceiver 127 at the CSCS 102 transmits a repeating sequence of a transmitted RF signal for a first predetermined time period followed by a pause in transmission for a second predetermined time period. The first predetermined time period and the second predetermined time period can be the same duration of time, or they can be different durations of times from each other, according to various siren test protocols. The monitored output signal of RSSI, according to this example, can be considered collected sensor data collected by the processor 129 during the testing process.

The processor 128 collects sensor data from the wireless transceiver 134 under test, stores the collected sensor data 410 in the data storage repository 132, analyzes the collected data 410 to detect, for example, whether any operational parameter value is outside of expected range of values indicating alarm condition(s), and stores alarm condition(s) flag(s) in the data storage repository 132 based on the analyzed collected data 410 being determined, in the example, outside of expected range of operational parameter values.

The processor 128, at step 812, generates message packet(s) containing the test results data, including any detected alarm condition(s), which is/are to be reported to the CSCS 102. The processor 128, at step 814, monitors for a time when the Siren 1 Test Set 104 is permitted to transmit the message packet(s) to the CSCS 102. Each Test Set 104, 106, 108, according to various embodiments, has a defined time interval for transmitting its test results to the CSCS 102, thereby avoiding collisions in possible overlapping transmissions from two or more transceivers 134 in respective two or more Test Sets 104, 106, 108. An alternative approach can be a master-slave communication protocol in which the CSCS 102 sends a message packet as a query to each Test Set 104, 106, 108, requesting a response with test results packet(s) when ready or a response indicating that test results are not ready. In this alternative example approach, the communication protocol can avoid message transmission collisions. Accordingly, when it is a defined time for the Siren 1 Test Set 104 to report its test results to the CSCS 102, the processor 128 starts transmitting the message packet(s) via the wireless transceiver 134 to the CSCS 102.

It should be noted that, according to various embodiments, an ad hoc communication protocol can be followed by the various Test Sets 104, 106, 108, and the CSCS 102, to both avoid collisions in communications from two or more Test Sets and to improve reliability of delivering message packets to the CSCS 102.

At a defined time interval for the Siren 1 Test Set 104 to transmit its message packet(s), at step 814, the processor 128 starts, at step 816, the transmission of the packet(s) to the CSCS 102. The processor 128 then proceeds to exit the operational sequence, at step 818.

As will be appreciated by one of ordinary skill in the art, in view of the discussions herein, aspects of the present invention may be embodied as a system, method, or computer program product.

Accordingly, one or more aspects of the present invention may take the form of an entire hardware embodiment, an entire software embodiment (including firmware, resident software, micro-code, etc.), or an embodiment combining software and hardware aspects that may all generally be referred to herein as a "circuit", "module", or "system". Furthermore, parts of the present invention may take the form of a computer program product embodied in one or more computer-readable medium(s) having the computer readable program code embodied thereon.

A system 100 may utilize any combination of computer-readable medium(s). The computer-readable medium may be a computer-readable signal medium or a computer-readable storage medium. A computer-readable storage medium is a tangible medium which may be, for example, but not limited to, an electronic, magnetic, optical, electromagnetic, infrared, or semiconductor system, apparatus, or device, or any suitable combination of the preceding.

More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the preceding. In the context of this document, a computer-readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the preceding.

Computer program code for carrying out operations for aspects of the present invention may be written in any combination of one or more programming languages, including an object-oriented programming language such as Java, Smalltalk, C++, or the like, and conventional procedural programming languages, such as the "C" programming language or similar programming languages. According to various embodiments of the invention, the program code may execute entirely on a user's computer, partly on a user's computer, as a stand-alone software package, partly on a user's computer and partly on a remote computer or entirely on a remote computer or a server. In the latter scenario, the remote computer or the server may be connected to the user's computer through any type of network, including one or more of a local area network (LAN), a wireless communication network, a wide area network (WAN), or a connection may be made to an external computer (for example, through the Internet using an Internet Service Provider).

Aspects of the present invention have been discussed above with reference to flow diagram illustrations and/or block diagrams of methods, apparatus (systems), and computer program products according to various embodiments of the invention. It will be understood that each block of the flow diagram illustrations and/or block diagrams and combinations of blocks in the flow diagram illustrations and block diagrams can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices, to function in a particular manner, such that the instructions stored in the computer-readable medium produce an article of manufacture including instructions which implement the function/act specified in the flow diagram and/or block diagram block or blocks.

The computer program instructions may also be loaded onto a computer, other programmable data processing apparatus, or other devices, to cause operational steps to be performed on the computer, other programmable apparatus, or other devices, to produce a computer-implemented process (or method) such that the computer instructions which execute on the computer or other programmable apparatus provide processes for implementing the functions/acts specified in the flow diagram and/or block diagram block or blocks.

The terminology used herein is to describe particular embodiments only and is not intended to be limiting of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "a" or "an," as used herein, are defined as one or more than one. The term "plurality", as used herein, is defined as two or more than two. The term "multiplicity", as used herein, is defined as a large number which can be at least three. The term "super-multiplicity", as used herein, is defined as a large number which can be at least ten (10). The term "ultra-multiplicity", as used herein, is defined as a large number which can be at least fifty (50). The term another, as used herein, is defined as at least a second or more. The terms "comprises" and/or "comprising", when used in this specification, specify the presence of stated features, steps, operations, elements, and/or components but do not preclude the presence or addition of one or more other features, steps, operations, elements, components, and/or groups thereof. The terms "including" and "having", as used herein, are defined as comprising (i.e., open language). The term "coupled", as used herein, is defined as "connected," although not necessarily directly and not necessarily mechanically.

The term "configured to" describes the hardware, software, or a combination of hardware and software that is adapted to, set up, arranged, built, composed, constructed, designed, or that has any combination of these characteristics to carry out a given function. The term "adapted to" describes the hardware, software, or a combination of hardware and software capable of performing, able to accommodate the performance of, that is suitable to perform, or that has any combination of the characteristics mentioned above to perform a given function. The terms "including" and "having," as used herein, are defined as comprising (i.e., open language).

The term "aftermarket" means equipment installed after the initial product (or system) was manufactured and sold. The term "retrofit" means an act of adding a component (e.g., a Test Set), a device (e.g., a set of sensors), or an accessory, to a pre-existing something (e.g., a rotating siren) that did not have it when the something (e.g., the rotating siren) was manufactured.

The term "affirmatively operational", as used herein, means an operational state of certain equipment, device, or component, of a rotating siren, which is operational (e.g., operating) as designed and constructed. The term "negatively operational", as used herein, means an operational state of certain equipment, device, or component, of a rotating siren, which is not operational (e.g., not operating) as designed and constructed.

The phrases "at least one of <A>, <B>, . . . and <N>" or "at least one of <A>, <B>, . . . <N>, or combinations thereof" or "<A>, <B>, . . . and or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The description of the present invention has been presented for purposes of illustration and description but is not intended to be exhaustive or limited to the invention in the form disclosed. Many modifications and variations will be apparent to those of ordinary skill in the art without departing from the scope of the invention. Each embodiment was chosen and described in order to best explain the principles of the invention and the practical application and to enable others of ordinary skill in the art to understand the invention for various embodiments with various modifications as are suited to the particular use contemplated.

What is claimed is:

1. A system comprising a multiplicity of remote siren equipment test systems each remote siren equipment test system being communicatively coupled with a respective one of a multiplicity of rotating sirens distributed over diverse wide geographic regions, and each remote siren equipment test system being communicatively coupled with a remotely located central siren control system (CSCS) that is remotely located from each of the rotating sirens in a nuclear power plant emergency preparedness alert notification system, each of the remote siren equipment test systems comprising:

a processor;

memory;

a network interface device communicatively coupled with at least one network for communicating messages between each of the multiplicity of remote siren equipment test systems and the CSCS; and at least one sensor operatively coupled with at least one component of the respective one rotating siren for automatically monitoring operation thereof and outputting sensor data representative thereof; and the processor, communicatively coupled with the memory, the network interface device, and the at least one sensor, in response to executing computer instructions, performing operations comprising:

sending an actuation signal to the at least one component of the respective one rotating siren, based on receiving from the CSCS via the at least one network a start siren test command;

monitoring output sensor data from the at least one sensor, the output sensor data indicating rotational motion of the at least one component;

analyzing the output sensor data;

determining that the at least one component is one of affirmatively operational or negatively operational to cause the at least one component to rotate, based on the analyzing of the output sensor data;

storing in the memory a rotating siren status message, adding selective address information to the rotating siren status message making it destined for reception by the CSCS in response to being transmitted in the at least one network;

adding in the rotating siren status message an indication of operational status of the at least one component, being one of affirmatively operational or negatively operational, based on the determining; and transmitting, with the network interface device, the rotating siren status message in the at least one network destined for reception by the CSCS, the rotating siren status message including the indication of operational status of the at least one component.

2. The system of claim 1, wherein the at least one sensor is operatively coupled with the at least one component including a rotating motion actuator mechanically coupled to a directional sound output port configured to directionally emit an audible emergency alert signal therefrom and which in response to rotation of the rotating motion actuator the directional sound output port rotates to thereby emit the audible emergency alert signal in a near omnidirectional sound output pattern from the rotating siren; and wherein the processor, in response to executing computer instructions, performing operations comprising:

sending an actuation signal to the rotating motion actuator to mechanically rotate the directional sound output port, based on receiving, from the CSCS via the at least one network, the start siren test command;

monitoring output sensor data from the at least one sensor, the output sensor data indicating rotational motion of the rotating motion actuator;

analyzing the output sensor data indicating rotational motion of the rotating motion actuator;

determining that the rotating motion actuator is one of affirmatively operational or negatively operational to cause the directional sound output port to rotate, based on the analyzing of the output sensor data;

adding in the rotating siren status message an indication of operational status of the rotating motion actuator, being one of affirmatively operational or negatively operational, based on the determining; and transmitting, with the network interface device, the rotating siren status message in the at least one network destined for reception by the CSCS, the rotating siren status message including the indication of operational status of the rotating motion actuator.

3. The system of claim 1, wherein the CSCS comprises:

an automated maintenance controller;

a siren maintenance tracking database, which contains a multiplicity of siren records, each siren record in the siren maintenance tracking database being associated with a respective one of the multiplicity of rotating sirens, for tracking testing and maintenance history information of each one of the multiplicity of rotating sirens stored in a respective siren record in the siren maintenance tracking database;

a siren maintenance history analyzer; and at least one processor, operatively coupled to the automated maintenance controller, the siren maintenance tracking database, and the siren maintenance history analyzer, and in response to executing computer instructions the at least one processor performing operations comprising:

updating siren testing and maintenance history information in an individual siren record in the multiplicity of siren records based on receiving, from a respective remote siren equipment test systems in the multiplicity of remote siren equipment test systems which is associated with the individual siren record, one or more rotating siren status messages including indication of operational status of at least one component of a respective one of the multiplicity of rotating sirens associated with the individual siren records;

analyzing siren test and maintenance history information stored in each siren record in the multiplicity of siren records;

predicting an alarm condition that will occur for a particular component of a rotating siren associated with an individual siren record in the multiplicity of siren records, based on the analyzing of the test and maintenance history information stored in the individual siren record; and reporting, via a user interface, a future occurrence of a failure of the particular component of the rotating siren associated with the individual siren record, based on the predicting an alarm condition for the particular component.

4. The system of claim 3, wherein the predicting an alarm condition for the particular component of the rotating siren associated with the individual siren record, comprises:

determining a trend over time of operational parameter values deviating by greater than one or more predetermined thresholds from expected specified values for an operational parameter associated with the particular component of the rotating siren associated with the individual siren record.

5. A remote siren equipment test system for being communicatively coupled with a respective one rotating siren in a multiplicity of rotating sirens distributed over diverse wide geographic regions in a nuclear power plant emergency preparedness alert notification system, and the remote siren equipment test system for being communicatively coupled with a remotely located central siren control system (CSCS) that is remotely located from each of the rotating sirens, the remote siren equipment test system comprising:

a processor;

memory;

a network interface device communicatively coupled with at least one network for communicating messages between the remote siren equipment test system and the CSCS; and at least one sensor for being operatively coupled with at least one component of a rotating siren that is communicatively coupled with the remote siren equipment test system, for automatically monitoring an operational parameter of the at least one component and outputting sensor data representative of values of the operational parameter; and the processor, communicatively coupled with the memory, the network interface device, and the at least one sensor, in response to executing computer instructions, performing operations comprising:

sending an actuation signal to the at least one component of the respective one rotating siren, based on receiving from the CSCS via the at least one network a start siren test command;

monitoring, output sensor data from the at least one sensor, the output sensor data indicating an operational status of the at least one component;

analyzing the output sensor data;

determining that the operational status is one of affirmatively operational or negatively operational to cause the at least one component to operate according to design, construction, and installation, of the at least one component in the rotating siren that is communicatively coupled with the remote siren equipment test system, based on the analyzing of the output sensor data;

storing in the memory a rotating siren status message, and adding selective address information to the rotating siren status message making it destined for reception by the CSCS in response to being transmitted in the at least one network;

adding in the rotating siren status message an indication of operational status of the at least one component, being one of affirmatively operational or negatively operational, based on the determining; and transmitting, with the network interface device, the rotating siren status message in the at least one network destined for reception by the CSCS, the rotating siren status message including the indication of operational status of the at least one component.

6. The remote siren equipment test system of claim 5, wherein the at least one sensor is operatively coupled with the at least one component including a rotating motion actuator mechanically coupled to a directional sound output port configured to directionally emit an audible emergency alert signal therefrom and which in response to rotation of the rotating motion actuator the directional sound output port rotates to thereby emit the audible emergency alert signal in a near omnidirectional sound output pattern from the rotating siren; and wherein the processor, in response to executing computer instructions, performing operations comprising:

sending an actuation signal to the rotating motion actuator to mechanically rotate the directional sound output port, based on receiving, from the CSCS via the at least one network, the start siren test command;

monitoring output sensor data from the at least one sensor, the output sensor data indicating a status of rotational motion of the rotating motion actuator;

analyzing the output sensor data;

determining that the rotating motion actuator is one of affirmatively operational or negatively operational to cause the directional sound output port to rotate, based on the analyzing of the output sensor data;

adding in the rotating siren status message an indication of operational status of the rotating motion actuator, being one of affirmatively operational or negatively operational, based on the determining; and transmitting, with the network interface device, the rotating siren status message in the at least one network destined for reception by the CSCS, the rotating siren status message including the indication of operational status of the rotating motion actuator.

7. The remote siren equipment test system of claim 6, wherein the at least one sensor is operatively coupled with the at least one component including a power supply providing power to the rotating motion actuator; and wherein the processor, in response to executing computer instructions, performing operations comprising:

sending an actuation signal to the rotating motion actuator to mechanically rotate the directional sound output port, based on receiving, from the CSCS via the at least one network, the start siren test command;

monitoring output sensor data from the at least one sensor, the output sensor data comprising sensed voltage and/or current signals of the power supply while providing power to the rotating motion actuator;

analyzing the output sensor data comprising sensed voltage and/or current signals of the power supply while providing power to the rotating motion actuator, by measuring positive or negative amplitude of the voltage and/or current signals and measuring timing of the voltage and/or current signals relative to each other to determine a time the rotating motion actuator takes to make a full rotation;

determining that the rotating motion actuator is one of affirmatively operational or negatively operational to cause the directional sound output port to rotate, based on the analyzing of the output sensor data;

adding in the rotating siren status message an indication of operational status of the rotating motion actuator, being one of affirmatively operational or negatively operational, based on the determining; and transmitting, with the network interface device, the rotating siren status message in the at least one network destined for reception by the CSCS, the rotating siren status message including the indication of operational status of the rotating motion actuator.

8. The remote siren equipment test system of claim 5, wherein the at least one sensor is configured for being operatively coupled, by technical personnel, to at least one component of a pre-existing rotating siren and thereby for retrofitting the at least one sensor to the pre-existing one rotating siren in a multiplicity of rotating sirens distributed over diverse wide geographic regions in a nuclear power plant emergency preparedness alert notification system.

9. The remote siren equipment test system of claim 5, wherein the remote siren equipment test system is configured for being retrofit installed, by technical personnel, to a pre-existing rotating siren, and thereby for retrofitting the remote siren equipment test system to the pre-existing rotating siren in a multiplicity of rotating sirens distributed over diverse wide geographic regions in a nuclear power plant emergency preparedness alert notification system.

10. The remote siren equipment test system of claim 5, wherein the processor, in response to executing computer instructions, performing operations comprising:

wirelessly receiving, from the CSCS via the at least one network, a siren stop command message; and sending a siren stop signal to a siren system controller to stop all operations of the siren, based on the wirelessly receiving the siren stop command message.

11. The remote siren equipment test system of claim 10, wherein the processor, in response to executing computer instructions, performing operations comprising:

performing a set of operations selected from the following:

a) wirelessly receiving, from the CSCS via the at least one network, a siren restart command message; and b) sending a siren restart signal to a siren system controller to restart and reset all operations of the siren to an initial operational state, based on the wirelessly receiving the siren restart command message; or c) sending a siren restart signal to a siren system controller to restart and reset all operations of the siren to an initial operational state, based on detecting a timer has counted down a pre-configured amount of time following the wirelessly receiving the siren stop command message.

12. A computer-implemented method of automatically monitoring operational status of each rotating siren in a multiplicity of rotating sirens distributed over diverse wide geographic regions and each being remotely-located from, and communicatively coupled with, a central siren control system (CSCS), in a nuclear power plant emergency preparedness alert notification system, at least one rotating siren in the multiplicity of rotating sirens comprises a plurality of components including:

a rotating motion actuator, mechanically coupled to a directional sound output port, which in response to being actuated by an actuator driver circuit causes the directional sound output port to rotate while emitting an audible emergency signal from the directional sound output port; and a test set computer processing system (Test Set), comprising:

a network interface device communicatively coupled with one or more networks to communicate information signals through the one or more networks with the CSCS;

one or more sensors operatively coupled to the rotating motion actuator; and a processor communicatively coupled with the network interface device and the one or more sensors; and the computer-implemented method comprising:

electrically driving the actuator driver circuit thereby actuating the rotating motion actuator to mechanically rotate the directional sound output port;

monitoring output sensor data from the one or more sensors, the output sensor data indicating rotational motion of the rotating motion actuator;

analyzing the output sensor data indicating rotational motion of the rotating motion actuator;

determining, with the processor, that the rotating motion actuator is one of affirmatively operational or negatively operational to cause the directional sound output port to rotate, based on the analyzing of the output sensor data;

adding in a rotating siren status message an indication of operational status of the rotating motion actuator, being one of affirmatively operational or negatively operational, based on the determining; and transmitting, with the network interface device, the rotating siren status message in the one or more networks destined for reception by the CSCS, the rotating siren status message including the indication of operational status of the rotating motion actuator.

13. The computer-implemented method of claim 12, wherein the one or more one sensors are operatively coupled with a power supply providing power to the rotating motion actuator; and the computer-implemented method comprising:

monitoring output sensor data from the one or more sensors operatively coupled with the power supply, the output sensor data comprising sensed voltage and/or current signals of the power supply while providing power to the rotating motion actuator;

analyzing the output sensor data comprising sensed voltage and/or current signals of the power supply while providing power to the rotating motion actuator, by measuring positive or negative amplitude of the voltage and/or current signals and measuring timing of the voltage and/or current signals relative to each other to determine a time the rotating motion actuator takes to make a full rotation; and determining that the rotating motion actuator is one of affirmatively operational or negatively operational to cause the directional sound output port to rotate, based on the analyzing of the output sensor data indicating whether a sensor monitored voltage is outside of a predefined voltage range or a sensor monitored current is outside of a predefined current range, or both.

14. The computer-implemented method of claim 13, wherein:

the predefined voltage range is from 23 volts to 25 volts; and the predefined current range is from 2.5 amps to 4 amps.

15. The computer-implemented method of claim 12, further comprising:

retrofitting the one or more sensors to the at least one rotating siren in the multiplicity of rotating sirens distributed over diverse wide geographic regions in a nuclear power plant emergency preparedness alert notification system.

16. The computer-implemented method of claim 12, further comprising:

retrofitting the Test Set to the at least one rotating siren in the multiplicity of rotating sirens distributed over diverse wide geographic regions in a nuclear power plant emergency preparedness alert notification system.

17. The computer-implemented method of claim 12, wherein the at least one rotating siren comprises:

an amplifier/driver circuit for driving a speaker to emit an audible emergency signal from the directional sound output port of the at least rotating siren; and wherein the the Test Set comprises one or more sensors operatively coupled to a power supply providing power to the amplifier/driver circuit, and the processor is communicatively coupled with the one or more sensors operatively coupled to the power supply; and wherein the computer-implemented method comprising:

electrically driving the amplifier/driver circuit to drive the speaker to emit an audible emergency signal;

monitoring output sensor data from the one or more sensors operatively coupled to the power supply, the output sensor data comprising sensed voltage and/or current signals of the power supply while providing power to the amplifier/driver circuit;

analyzing the output sensor data comprising sensed voltage and/or current signals of the power supply while providing power to the amplifier/driver circuit, by measuring positive or negative amplitude of the voltage and/or current signals and measuring timing of the voltage and/or current signals relative to each other;

determining that the amplifier/driver circuit is one of affirmatively operational or negatively operational to drive the speaker to emit an audible emergency signal, based on the analyzing of the output sensor data;

adding in the rotating siren status message an indication of operational status of the amplifier/driver circuit, being one of affirmatively operational or negatively operational, based on the determining; and transmitting, with the network interface device, the rotating siren status message in the one or more networks destined for reception by the CSCS, the rotating siren status message including the indication of operational status of the amplifier/driver circuit.

18. The computer-implemented method of claim 12, wherein the at least one rotating siren comprises:

a wireless transceiver comprising a transmitter portion and a receiver portion, wherein:

the transmitter portion of the wireless transceiver wirelessly transmits RF signals to a remotely located wireless receiver of the CSCS, and the receiver portion of the wireless transceiver wirelessly receives transmitted RF signals from a remotely located wireless transmitter of the CSCS; and wherein the Test Set comprises one or more sensors operatively coupled to the transmitter portion of the wireless transceiver, and which monitor forward power and reverse power of the transmitter portion while wirelessly transmitting RF signals, and based on the monitoring of the forward power and the reverse power the one or more sensors output sensor data; and wherein the processor is communicatively coupled with the one or more sensors operatively coupled to the transmitter portion; and wherein the computer-implemented method comprising:

electrically driving the transmitter portion of the wireless transceiver to wirelessly transmit RF signals;

monitoring, by the processor, based on the electrically driving the transmitter portion, the output sensor data from the one or more sensors operatively coupled to the transmitter portion;

analyzing the output sensor data from the one or more sensors operatively coupled to the transmitter portion;

determining, with the processor, that the transmitter portion is either affirmatively operational or negatively operational to wirelessly transmit RF signals, based on analysis of the output sensor data from the one or more sensors operatively coupled to the transmitter portion;

adding in the rotating siren status message an indication of operational status of the transmitter portion, being one of affirmatively operational or negatively operational, based on the determining; and transmitting, with the network interface device, the rotating siren status message in the one or more networks destined for reception by the CSCS, the rotating siren status message including the indication of operational status of the transmitter portion.

19. The computer-implemented method of claim 12, wherein the at least one rotating siren comprises:

a wireless transceiver comprising a transmitter portion and a receiver portion, wherein:

the transmitter portion of the wireless transceiver wirelessly transmits RF signals to a remotely located wireless receiver of the CSCS, and the receiver portion of the wireless transceiver wirelessly receives transmitted RF signals from a remotely located wireless transmitter of the CSCS; and wherein the Test Set comprises one or more sensors operatively coupled to the receiver portion of the wireless transceiver, and which monitor a receiver signal strength indicator (RSSI) of the receiver portion, and based on the monitoring the one or more sensors output sensor data; and wherein the processor is communicatively coupled with the one or more sensors operatively coupled to the receiver portion; and wherein the computer-implemented method comprising:

electrically controlling the receiver portion of the wireless transceiver to receive contemporaneously wirelessly transmitted RF signals from the CSCS;

monitoring by the processor, based on the electrically controlling the receiver portion, the output sensor data from the one or more sensors operatively coupled to the receiver portion;

analyzing the output sensor data from the one or more sensors operatively coupled to the receiver portion;

determining, with the processor, that the receiver portion is either affirmatively operational or negatively operational to receive wirelessly transmitted RF signals from the remotely located wireless transmitter of the CSCS, based on analysis of the output sensor data from the one or more sensors operatively coupled to the receiver portion;

adding in the rotating siren status message an indication of operational status of the receiver portion, being one of affirmatively operational or negatively operational, based on the determining; and transmitting, with the network interface device, the rotating siren status message in the one or more networks destined for reception by the CSCS, the rotating siren status message including the indication of operational status of the receiver portion.

20. The computer-implemented method of claim 12, wherein the CSCS comprises:

a siren maintenance tracking database, which contains a multiplicity of siren records, each siren record in the siren maintenance tracking database being associated with a respective one rotating siren of the multiplicity of rotating sirens, for tracking testing and maintenance history information of each one rotating siren of the multiplicity of rotating sirens, which is stored in a respective siren record in the siren maintenance tracking database; and wherein the computer-implemented method comprising:

updating siren testing and maintenance history information in an individual siren record in the multiplicity of siren records based on receiving, from a respective Test Set in one rotating siren in the multiplicity of rotating sirens which is associated with the individual siren record, one or more rotating siren status messages including indication of operational status of at least one component of a respective one of the multiplicity of rotating sirens which is associated with the individual siren record;

analyzing siren testing and maintenance history information stored in each siren record in the multiplicity of siren records;

predicting an alarm condition that will occur for a particular component of a rotating siren associated with an individual siren record in the multiplicity of siren records, based on the analyzing of the testing and maintenance history information stored in the individual siren record; and reporting, via a user interface, a future occurrence of a failure of the particular component of the rotating siren associated with the individual siren record, based on the predicted alarm condition for the particular component.

* * * * *